(12) United States Patent
Iwasaki

(10) Patent No.: US 7,190,857 B2
(45) Date of Patent: Mar. 13, 2007

(54) COMMUNICATION SYSTEM USING SHEET LIGHT GUIDE

(75) Inventor: Osamu Iwasaki, Fujinomiya (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 6 days.

(21) Appl. No.: 11/044,061

(22) Filed: Jan. 28, 2005

(65) Prior Publication Data
US 2005/0163422 A1    Jul. 28, 2005

(30) Foreign Application Priority Data
Jan. 28, 2004    (JP)    ............... 2004-019970

(51) Int. Cl.
*G02B 6/26* (2006.01)
*G02B 6/10* (2006.01)
(52) U.S. Cl. ........................... 385/32; 385/129
(58) Field of Classification Search ............... 385/24, 385/32, 39, 42, 129, 901
See application file for complete search history.

(56) References Cited

U.S. PATENT DOCUMENTS

| | | |
|---|---|---|
| 5,542,017 A | 7/1996 | Koike |
| 5,548,670 A | 8/1996 | Koike |
| 5,822,475 A | 10/1998 | Hirota et al. |
| 6,169,836 B1 * | 1/2001 | Sugiyama et al. .......... 385/123 |
| 6,714,711 B1 * | 3/2004 | Lieberman et al. ......... 385/124 |
| 2005/0100282 A1 * | 5/2005 | Okada et al. ................. 385/46 |

FOREIGN PATENT DOCUMENTS

| | | |
|---|---|---|
| EP | 1 443 348 A2 | 8/2004 |
| JP | 11-31035 A | 2/1999 |

OTHER PUBLICATIONS

"High-Uniformity Star Coupler Using Diffused Light Transmission", Osamu Takanashi, et al., IEICE Transactions on Electronics, vol. E84-C, No. 3, pp. 339-345, Mar. 2001.

* cited by examiner

*Primary Examiner*—Michelle Connelly-Cushwa
(74) *Attorney, Agent, or Firm*—Sughrue Mion, PLLC

(57) ABSTRACT

In a communication system using a sheet light guide 10 which is formed in a manner that the sheet light guide contains light-scattering particles in a sheet optical medium, and propagates a signal light incident from one end surface thereof to the other end surface side to which a photodetector is coupled, while scattering the signal light by the particles, at least two of the sheet light guides 10 are coupled to each other with an angle-converting light guide 90 interposed therebetween.

15 Claims, 27 Drawing Sheets

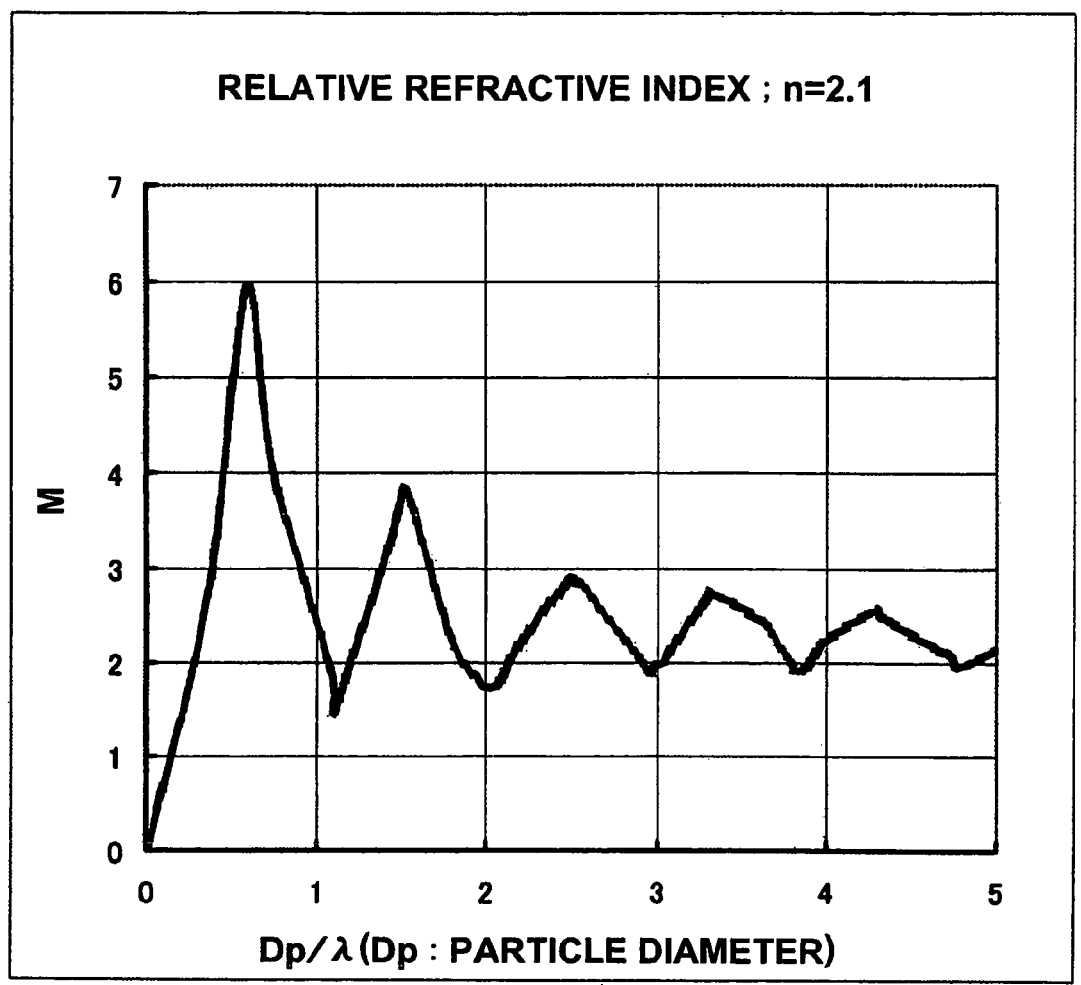

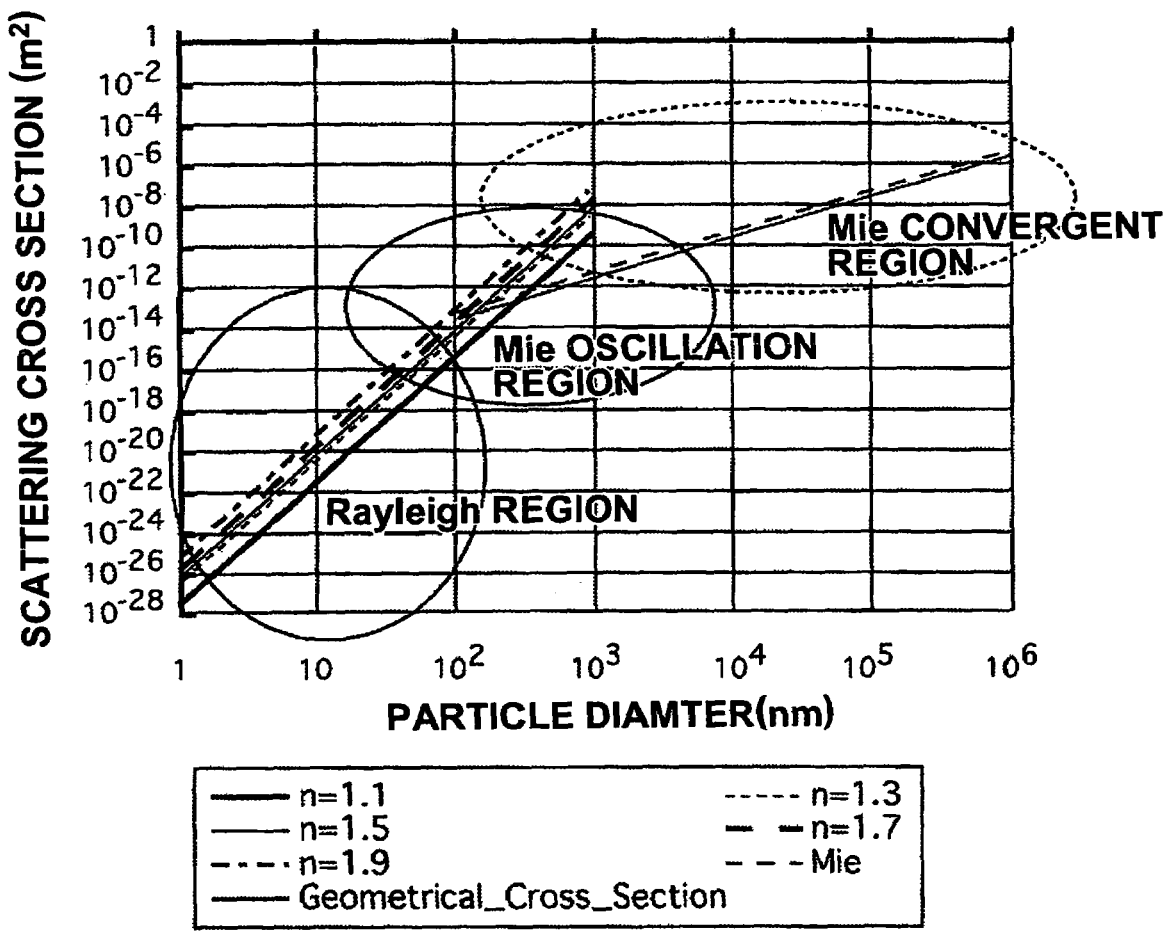

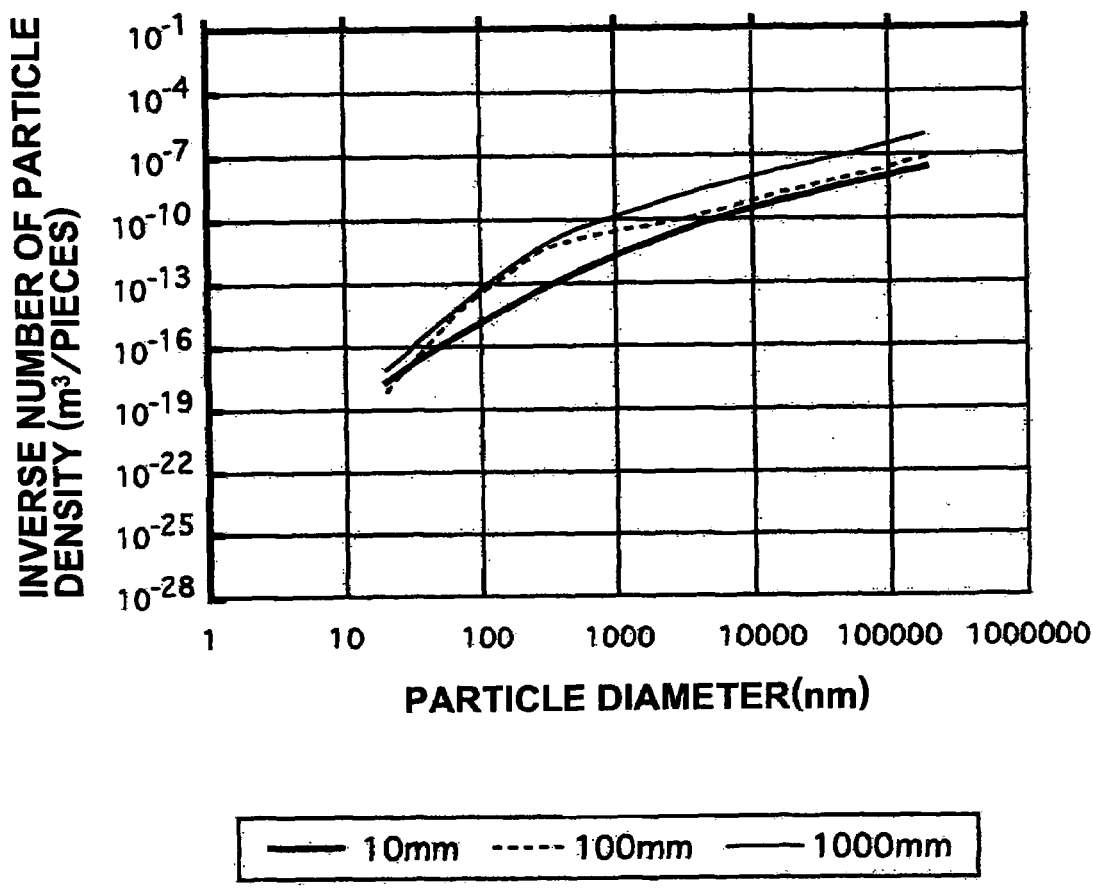

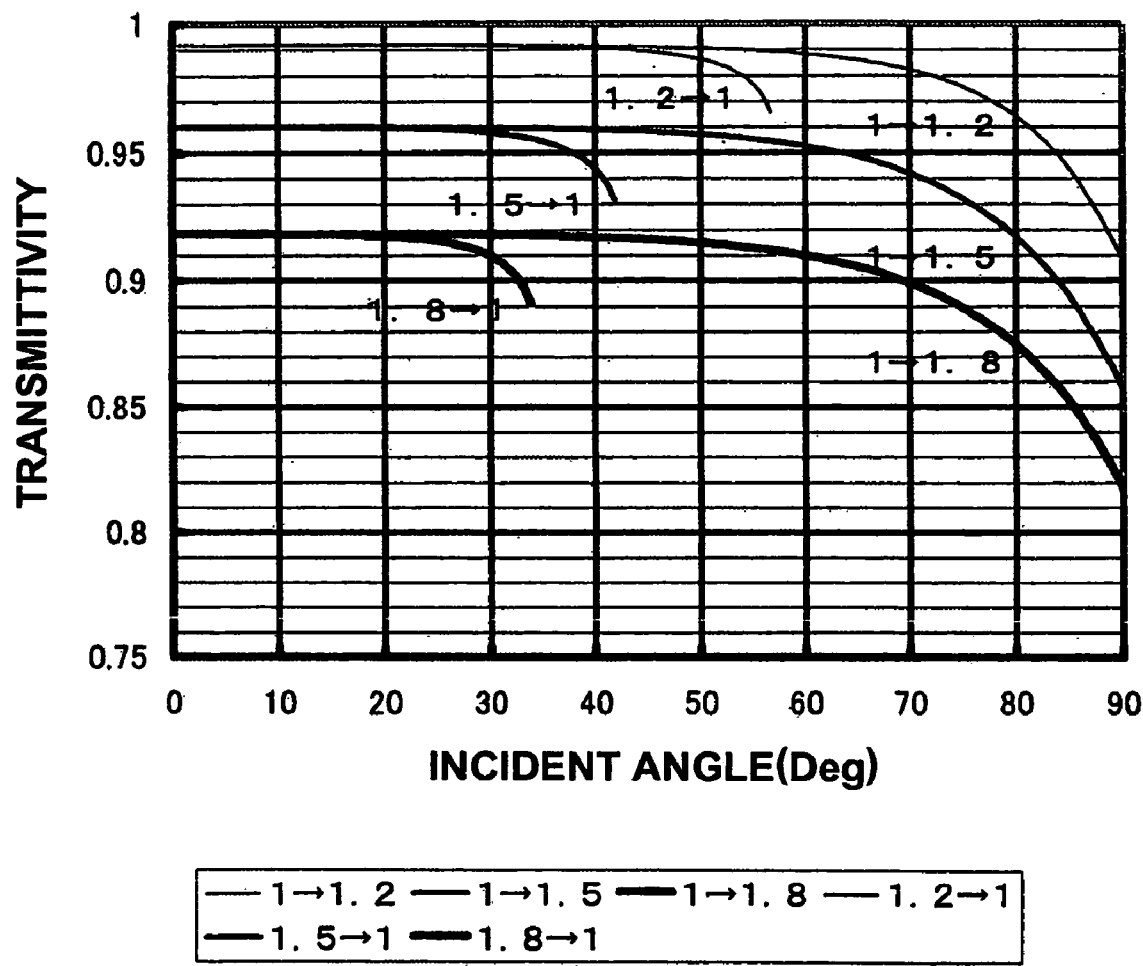

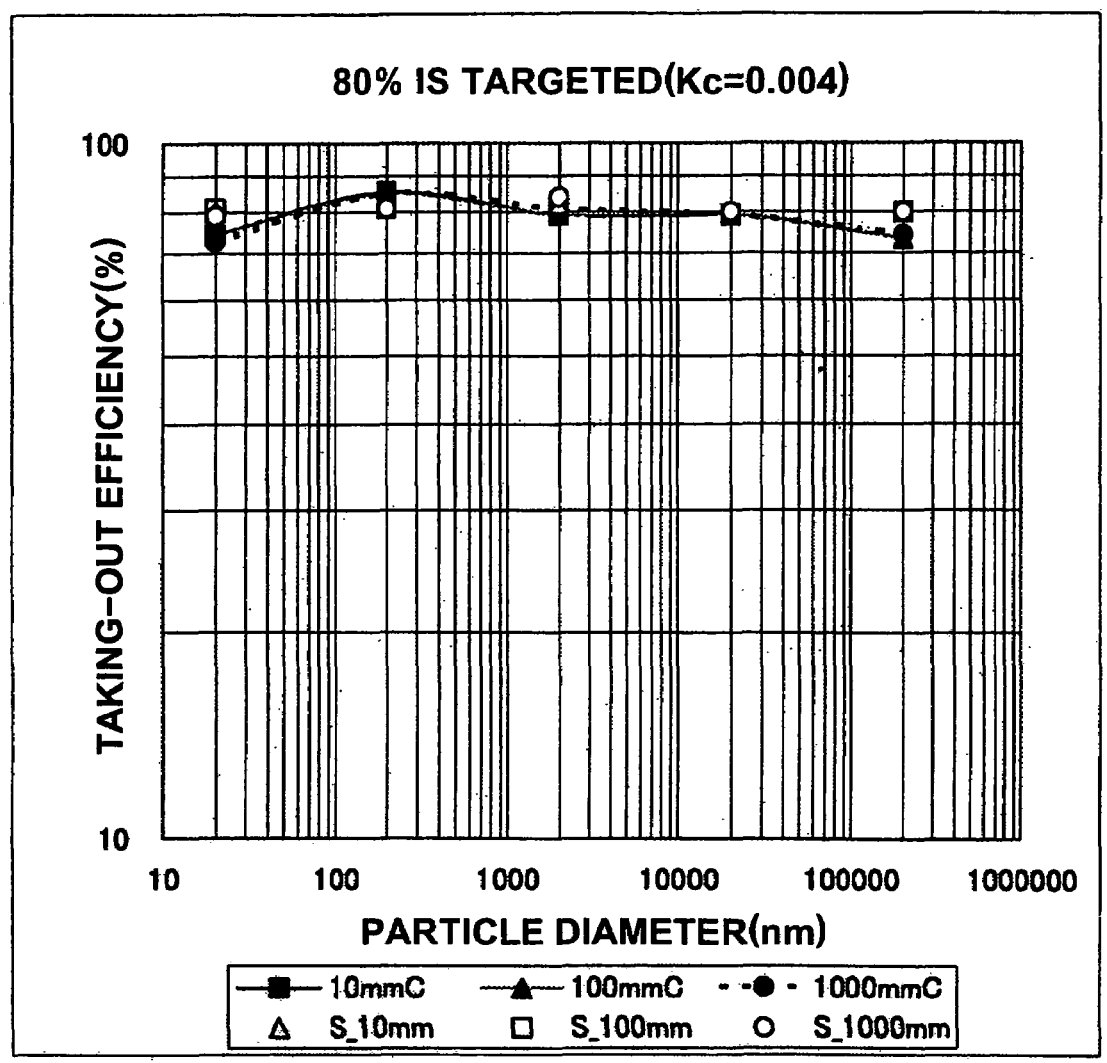

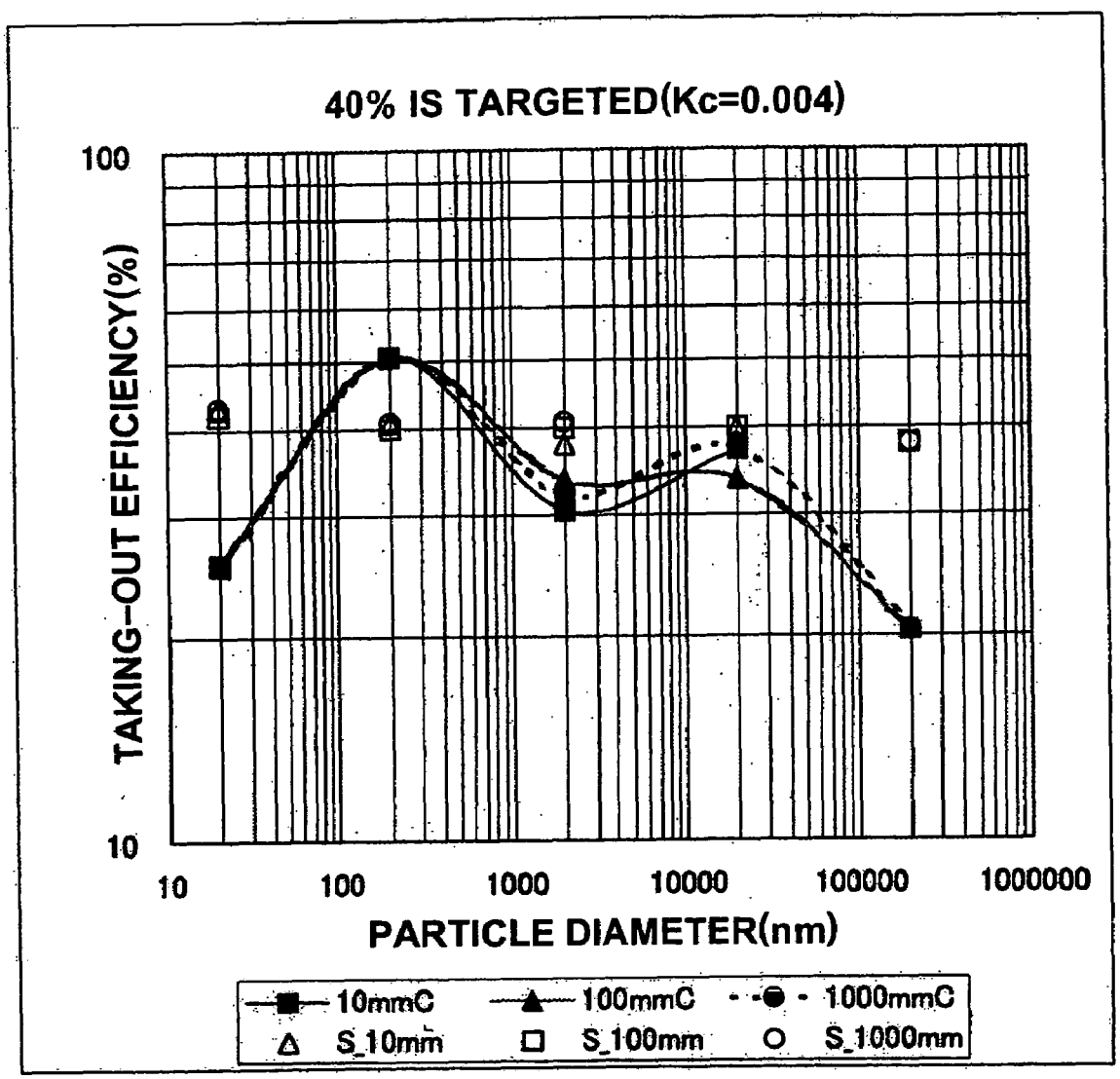

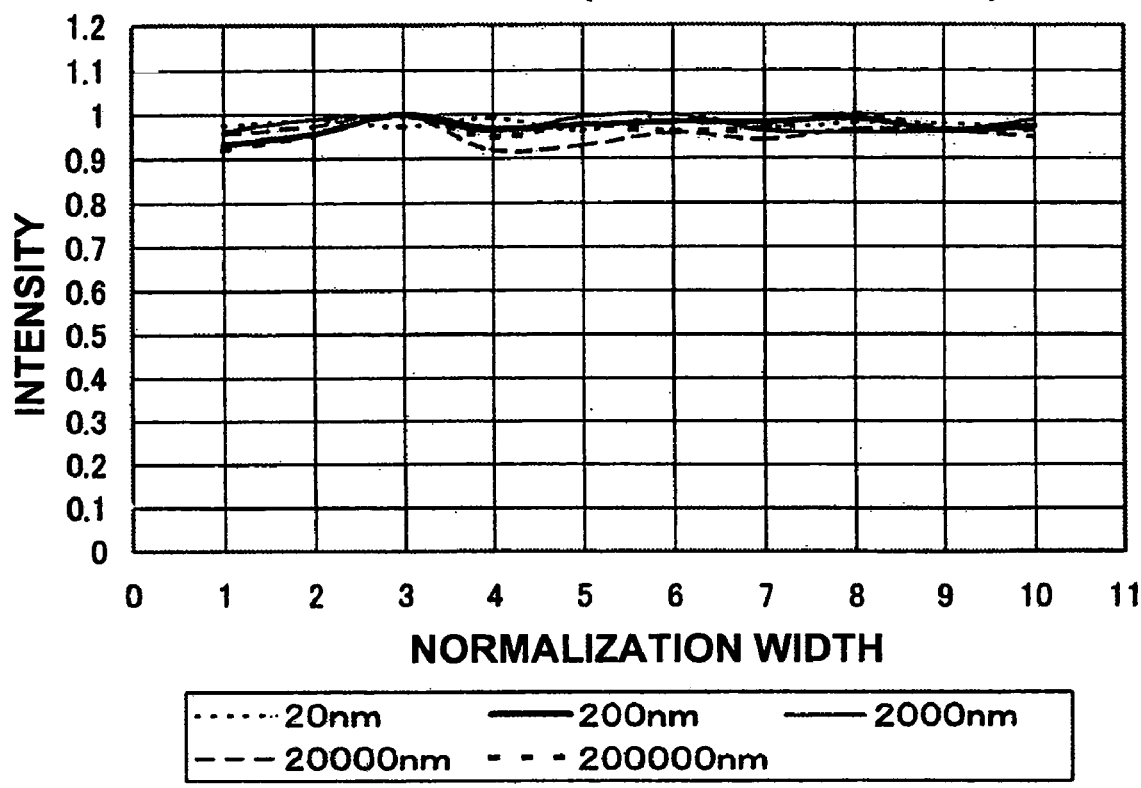

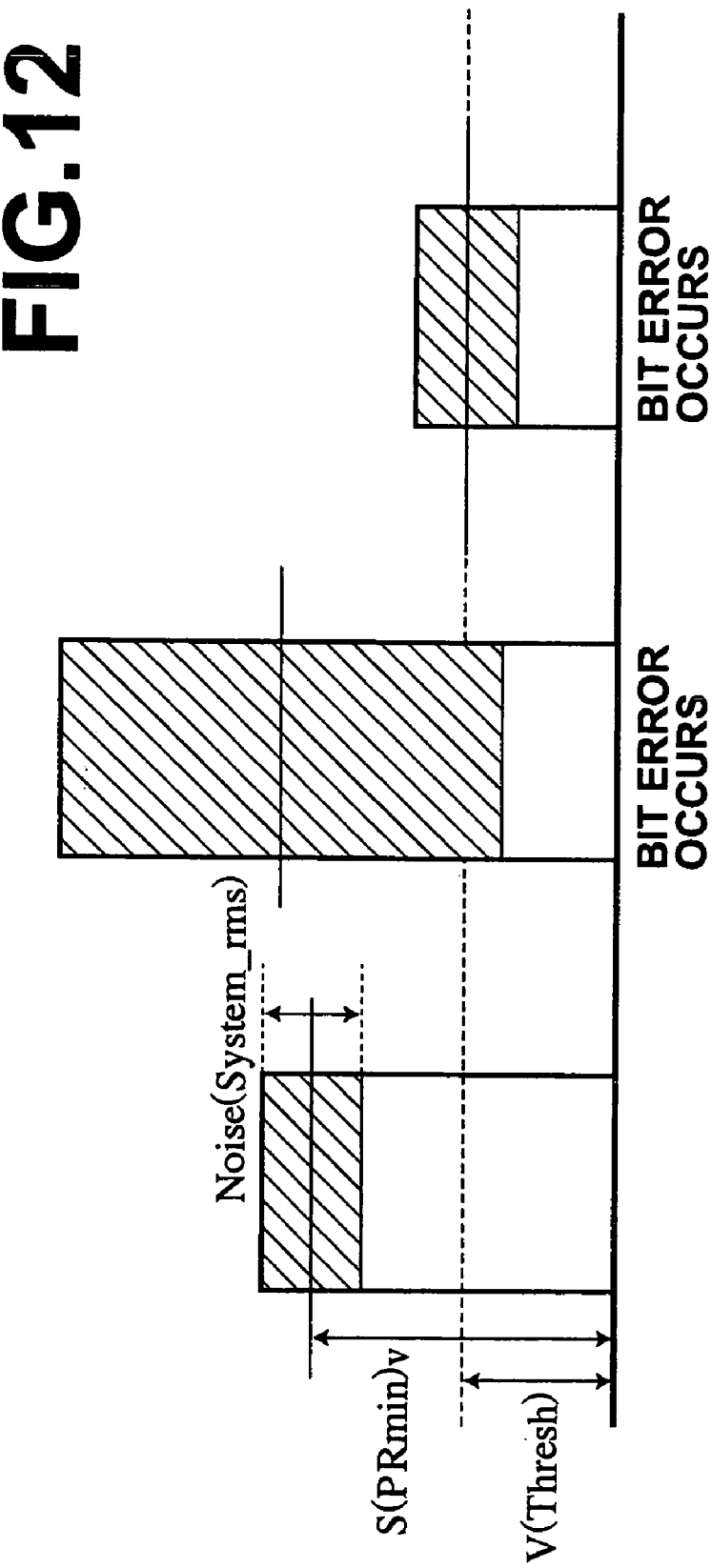

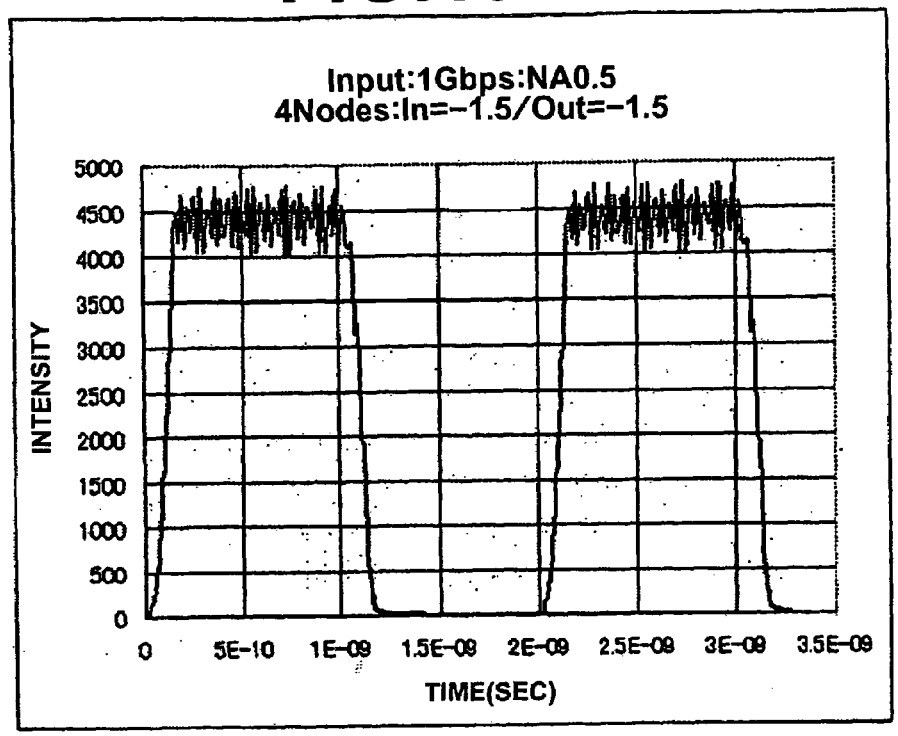
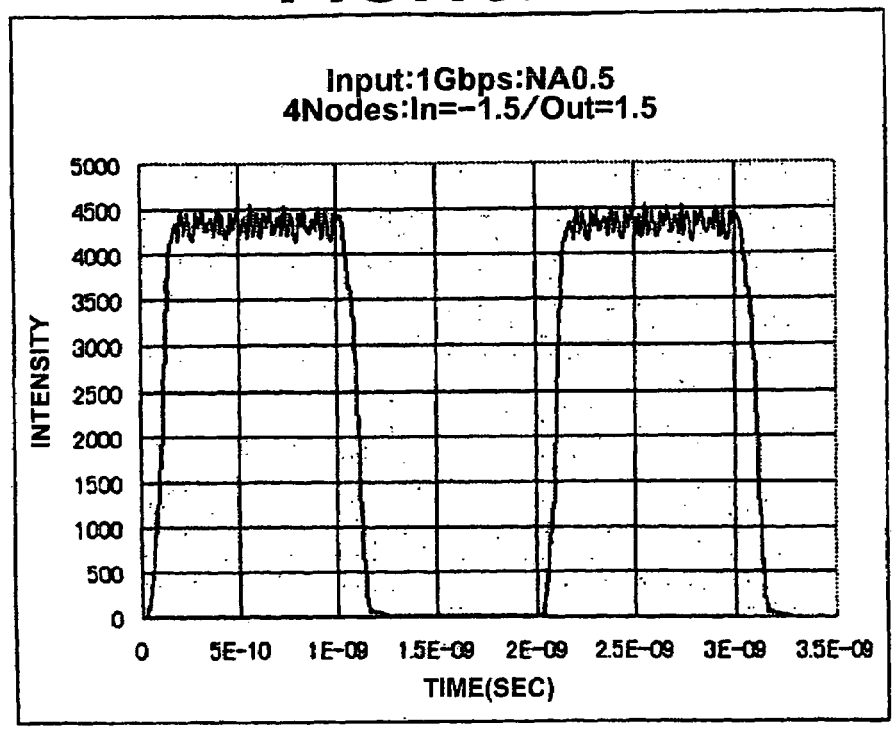

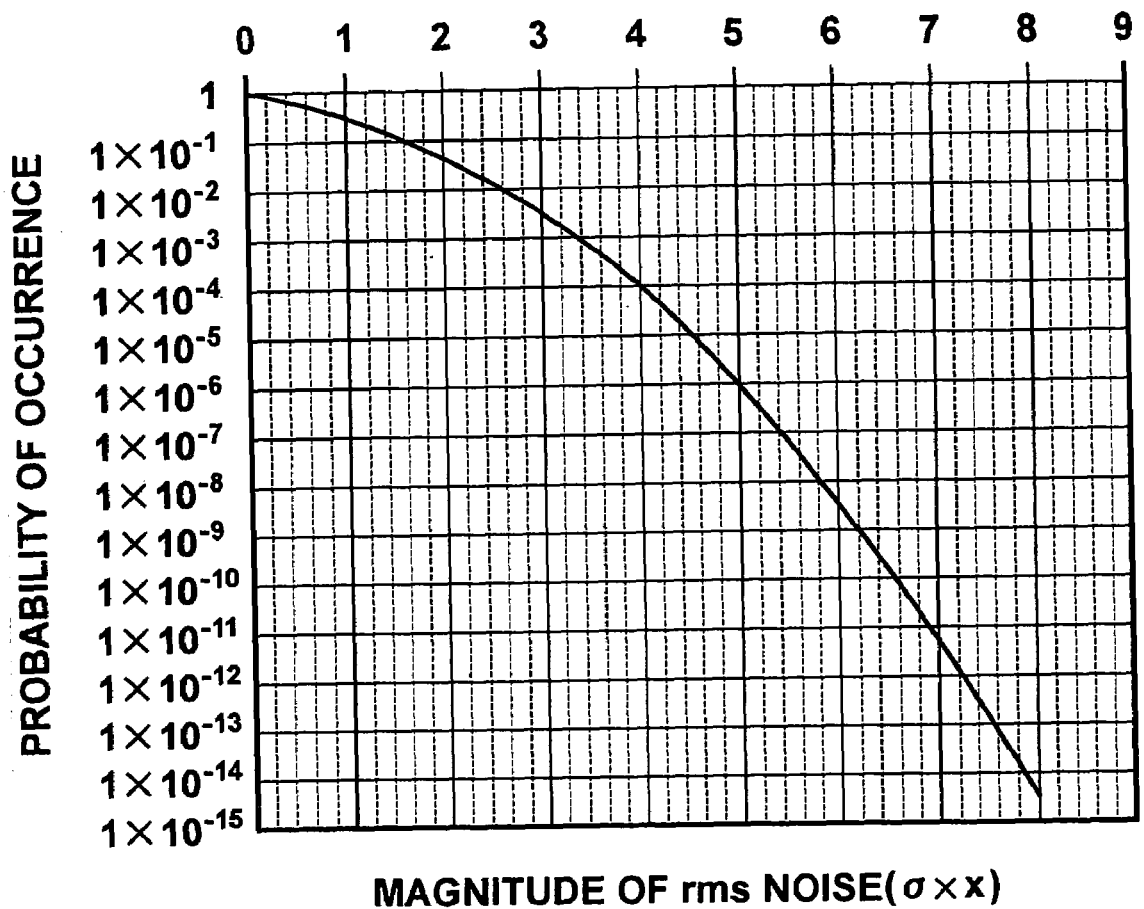

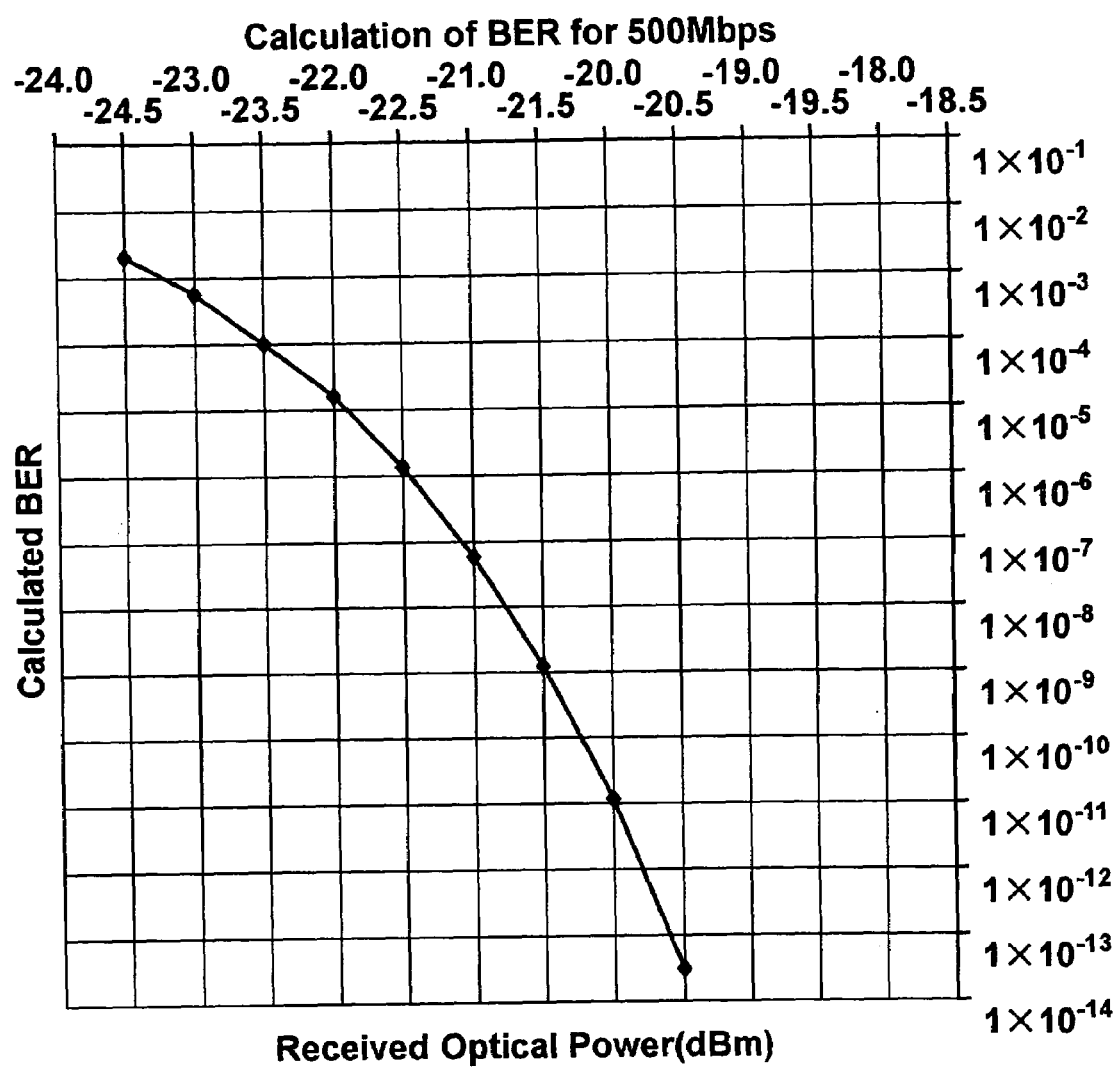

COMMUNICATION SYSTEM USING SHEET LIGHT GUIDE

BACKGROUND OF THE INVENTION

1. Field of the Invention

The present invention relates to a communication system using a light guide, and particularly, relates to a sheet light guide which is formed in a manner that the sheet light guide contains light-scattering particles in a sheet optical medium, and propagates light incident from one end surface thereof to the other end surface side while scattering the light by the particles.

2. Description of the Related Art

Heretofore, for example, as described in U.S. Pat. Nos. 5,548,670 and 5,542,017, a light guide is known, which is formed by containing light-scattering particles in an optical medium such as polymethylmethacrylate (PMMA), and propagates light incident from one end surface thereof to the other end surface side while scattering the light by the particles.

Such a light guide is that which propagates the light while repeatedly scattering the light by the particles in the optical medium in addition to the action of total reflection at an interface between a side end surface of the light guide and a surrounding medium (air or cladding layer). Accordingly, in comparison with a light guide which propagates the light only by the action of the total reflection, the light guide thus described has an advantage in that light, the intensity thereof being made more uniform, can be taken out of an emitting end surface. For example, as described in U.S. Pat. No. 5,822,475, it is conceived, by utilizing this advantage, to apply such a type of light guide to the purpose of constituting an optical data bus (sheet bus). The optical data bus is that which is formed by use of a sheet optical medium, and in which one input unit inputting an optical signal is coupled to one end surface thereof, and a plurality of output units are coupled to the other end surface, thus distributing the inputted optical signal as a common signal to the plurality of output units.

Moreover, for example, as described in Japanese Unexamined Patent Publication No. 11 (1999)-31035, as such an optical data bus, one is also known, in which light-scattering portions are provided on a light-incident-side end portion of the sheet optical medium so as to correspond to respective signal light incident portions, and signal light scattered and branched by the light-scattering portions is propagated toward a light-emitting-side end portion of the optical medium.

A communication system using a sheet light guide formed by containing the light-scattering particles in the sheet optical medium as described in U.S. Pat. No. 5,822,475 can also be introduced into various instruments. In such a case of introduction, a sheet light guide must often be bent. However, in general, the sheet light guide has some thickness and is not very flexible. Accordingly, when a space in such an instrument is narrow and has a complicated shape, sometimes it becomes impossible to place the sheet light guide therein in a bent manner. This point becomes a serious problem in terms of replacing a communication system using electric wires in the instrument with the communication system using the sheet light guide.

SUMMARY OF THE INVENTION

In consideration of the above-described circumstances, it is an object of the present invention to provide a communication system using a sheet light guide, which can be easily placed even in the narrow and complicated space.

The communication system using a sheet light guide according to the present invention is:

a communication system using a sheet light guide which is formed as described above by containing light-scattering particles in a sheet optical medium and propagates, while scattering signal light incident from one end surface thereof by the particles, the signal light to the other end surface side to which a photodetector is coupled, wherein at least two of the sheet light guides are coupled to each other with an angle-converting light guide interposed therebetween.

The above-described angle-converting light guide is a light guide in which one and the other end surfaces individually coupled to the sheet light guides are in a mutually parallel state without facing each other and a portion between both of the end surfaces is bent or folded. Such an angle-converting light guide may be formed of the same material as that of the sheet light guides, or may be formed of a material different therefrom. Moreover, this angle-converting light guide is formed separately from the sheet light guides, and then coupled to the sheet light guides. Alternatively, the angle-converting light guide may be formed integrally with the sheet light guides by injection molding or the like. Furthermore, the light-scattering particles may be or may not be contained in this angle-converting light guide as in the sheet light guides. However, it is naturally desirable that the light-scattering particles be contained in the angle-converting light guide in terms of making an intensity distribution of emitted light even.

Note that, in the communication system using the sheet light guide according to the present invention, it is desirable that, when a scattering cross section of the particles is $\Phi$, a length of the optical medium in a light propagation direction is $L_G$, a particle density is Np, and a correction coefficient is $K_C$, a value of $\Phi \cdot Np \cdot L_G \cdot K_C$ be 0.9 or less.

Moreover, in the communication system using the sheet light guide according to the present invention, it is desirable that, when root mean square (rms) noise of the system is Noise (System_rms), an acceptable bit error rate is BER (accept), and a probability of occurrence of the Noise (System_rms) is Pr (Noise (System_rms)), the following is satisfied:

$Pr(\text{Noise}(\text{System\_rms}) \cdot Q) \leq BER(\text{accept})$ where Q is a proportionality constant.

Furthermore, in the communication system using the sheet light guide according to the present invention, it is desirable that, when rms noise of the system is Noise (System_rms), an arbitrary threshold value in binarization is V (Thresh), and a signal voltage outputted from a photodetector through a load resistor is S (PRmin) v, the following is satisfied:

$\{S(PRmin)v - V(Thresh)\} > \text{Noise}(\text{System\_rms}) \cdot Q$ where Q is a proportionality constant.

Moreover, when it is assumed that, in the sheet light guide for use in the present invention, light incident thereonto repeats reflection on respective surfaces other than incident/emitting end surfaces obeying Snell's Law, and when a refractive index of a peripheral medium is Ns, a refractive index of the optical medium as a base material is Nm, an incident angle is $\theta m$, and a refraction angle is $\theta s$, if $Nm \cdot \sin \theta m = Ns \cdot \sin \theta s$ is established in the case where the particles are not contained, it is desirable that the sheet light guide be formed of an optical medium of a shape satisfying sin θs>1.

Furthermore, when it is assumed that, in the sheet light guide, a light beam emitted from at least one emitting end surface conforms to Snell's Law in reflection/refraction thereof on the emitting end surface, and when a refractive index of a surrounding medium is Ns, a refractive index of the optical medium serving as a base material is Nm, an incident angle is θm, and a refraction angle is θs, if Nm·sin θm=Ns·sin θs is established in the case where the particles are not contained, it is desirable that the sheet light guide be formed of an optical medium of a shape satisfying sin θs<1.

Moreover, in the sheet light guide for use in the present invention, the particles mixed into the optical medium may be non-magnetic conductive particles following the Mie scattering theory. Furthermore, the particles may be mixed into the optical medium while a gradient is being given to a particle density thereof.

Furthermore, it is also possible to constitute this sheet light guide by combining a plurality of the optical mediums.

The communication system using the sheet light guide according to the present invention includes the angle-converting light guide as described above. Thus, even if it is difficult to bend the sheet light guides on both sides of the angle-converting light guide, a communication path can be bent so that the communication system can be easily put in the narrow and complicated space formed in the instrument. Accordingly, the communication system of the present invention becomes widely applicable in place of, for example, a communication system using a flexible circuit board and a flat cable which have been heretofore used for wiring in the narrow instrument. In addition, this communication system is not only capable of replacing the above-described conventional wiring, but is also resistant to electromagnetic noise because the communication system performs communication by means of optical signals. Meanwhile, the communication system can be constructed at low cost as compared with a communication system using optical fibers among communication systems, each performing communications by means of the optical signals.

Note that, in U.S. Pat. Nos. 5,548,670 and 5,542,017 described above, there has been proposed a light guide path for realizing a desired light intensity distribution by use of a structure in which a refractive index is nonuniform or by mixing/diffusing dielectric particles into the optical medium. Moreover, in these U.S. Pat. Nos. 5,548,670 and 5,542,017, there is described that an application of the Debye turbidity theory (Journal of Applied Physics Vol. 20 pp. 518 to 525 (1949)) makes it possible to increase the intensity of the scattering light, and to realize uniformity of the light intensity distribution at an emitting port. In "Theory on Thermal Fluctuations of Dielectric Constant in Gas or Liquid" (Annalen Der Physik 33 pp. 1275 to 1298 (1910), Debye refers particularly to a consideration regarding the scattering light. An expression given by Einstein in the above-described paper is as follows:

$$i/Io=(RT/N)\cdot[(\in-1)^2(\in+2)^2/P]\cdot(2\pi/\lambda)^4[V/(4\pi D)^2]\cos^2\theta \quad (1)$$

where i: light intensity at position apart from scattering element by distance D Io: intensity of incident light R: gas constant T: absolute temperature N: molecularity of molecules of 1 g ∈: square (dielectric constant) of refractive index for wavelength λ

P: pressure applied to fluid

λ: wavelength

V: volume of light-scattering element

D: distance from light-scattering element to observation point

74 : scattering angle

The above-described expression is transformed by Debye, and represented as follows:

$$i/I=<\eta>^2/\in^2(\pi^2 V/\lambda^4 R^2)\cdot(1+\cos^2\theta)/2\cdot\omega \quad (2)$$

where i: light intensity at position apart from scattering element by distance D Io: intensity of incident light ∈: dielectric constant of scattering element $<\eta>^2$: mean square value of fluctuations of dielectric constant of scattering element R: distance from observation point to scattering element λ: wavelength V: total volume of light-scattering element θ: scattering angle ω: correlation volume Moreover, the following is established:

$$\omega=4\pi\int\sin(ksr)/ksr/r^2\gamma(r)dr \quad (3)$$

where k: wave number s: length of resultant vector of unit vector of incident light and unit vector of emitted light r: distance between two points where fluctuations of dielectric constant occur, and s is equal to 2sin(θ/2).

According to Debye, the correlation volume ω can be integrated when the correlation function γ (r) is set as follows:

$$\gamma(r)=\exp(-r/a) \text{ (a: correlation distance)}$$

Accordingly, expression (3) can be represented as:

$$\omega=8\pi a^3/(1+k^2s^2a^2)^2 \quad (4)$$

From expressions (2) and (4), the following expression is established:

$$i/I=<\eta>^2/\in^2(\pi^2 V/\lambda^4 R^2)\cdot(1+\cos^2\theta)/2\cdot 8\pi a^3/(1+k^2s^2a^2)^2 \quad (4)$$

Here, by use of s=2sin(θ/2), expression (2) is transformed as follows:

$$i/I=4\pi a^3<\eta>^2/\in^2(\pi^2 V/\lambda^4 R^2)\cdot(1+\cos^2\theta)/(1+8\pi^2(1-\cos\theta)(a/\lambda)^2)^2 \quad (5)$$

The term for the intensity of the scattering angle in expression (4) is represented as follows:

$$f(\theta)=(1+\cos^2\theta)/(1+8\lambda^2(1-\cos\theta)(a/\lambda)^2)^2 \quad (6)$$

FIG. 1 shows the results on scattering angles versus normalization intensities which are obtained by calculating for each value of typical (a/λ) using this expression (6). Moreover, FIG. 2 shows results of obtaining the scattering angles versus the normalization intensities for each value of typical particle diameters Dp obtained based on the Mie scattering theory.

According to U.S. Pat. Nos. 5,548,670 and 5,542,017, the particle diameter can be conceived to be substantially equal to the correlation distance. Accordingly, it is understood from FIG. 1 that, although intensity of forward-scattering light is increased when the particle diameter is substantially equal in size to the wavelength, intensity of side-scattering light is extremely increased when the particle diameter exceeds ten times the wavelength, so that the light no longer travels forward. Meanwhile, according to the Mie scattering theory, as apparent from FIG. 2, the intensity of the forward-scattering light is still intense even if the particle diameter exceeds ten times the wavelength. It is understood that, in the case where the Debye turbidity theory is approximated by $\gamma(r)=\exp(-r/a)$, obtained results are approximate to the results of the Mie scattering theory when the particle diameter is substantially equal to the wavelength, but that the results are largely shifted from those of the Mie scattering theory for particle diameters larger than those substantially equal to the wavelength.

From the above consideration, the Mie scattering theory is conceived to be more suitable as a calculation method to be used for emitting the incident light with a uniform intensity distribution, in which the particles causing the light scattering are mixed into a desired optical medium. The Mie scattering theory shows Rayleigh scattering when the size of the particles is extremely smaller than the wavelength and shows Huygens-Fresnel diffraction when the size of the particles is extremely larger than the wavelength. Furthermore, the Mie scattering theory is for a single-particle system, and an analysis by means of a multi-particle system based on the Mie scattering theory is conceived to be necessary for scattering of multiple particles.

In manufacture of the sheet light guide for use in the present invention, designing conditions for realizing desired efficiency of taking out light can be easily obtained based on the above consideration. A method for the obtainment is described below in detail.

<Scattering Cross Section>

First, a scattering cross section $\Phi$ will be described. The concept of the scattering cross section is widely used not only in the Mie scattering theory but also in a radiation range of the $\gamma$-ray, the X-ray and the like and a long wavelength range of the microwave and the like besides light in the visible light range. When a relationship between the particle diameter and the wavelength is within the Rayleigh range, the scattering cross section $\Phi$ is represented as:

$$\Phi = 128 \cdot \pi^5 \cdot (a_P^6/3\lambda^4) \cdot \{(n^2-1)/(n^2+2)\}^2 \quad (7)$$

where $a_P$: particle radius
$\lambda$: wavelength of incident light
n: relative refractive index Meanwhile, in the Mie theory, the scattering cross section $\Phi$ is represented in the following expression (8):

$$\Phi = (\lambda^2/2\pi) \sum_{n=1}^{\infty} (2n+1) \cdot [|a_n|^2 + |b_n|^2] \quad (8)$$

where $\lambda$: wavelength of incident light $$a_n = \frac{\varphi n(\alpha) \cdot \varphi' n(\beta) - N \cdot \varphi n(\beta) \cdot \varphi' n(\alpha)}{\zeta n(\alpha) \cdot \varphi' n(\beta) - N \cdot \varphi n(\beta) \cdot \zeta' n(\alpha)}$$

$$bn = \frac{N \cdot \varphi n(\alpha) \cdot \varphi' n(\beta) - \varphi n(\beta) \cdot \varphi' n(\alpha)}{N \cdot \zeta n(\alpha) \cdot \varphi' n(\beta) - \varphi n(\beta) \cdot \zeta' n(\alpha)}$$

$$\varphi n(kr) = (\pi kr/2) \cdot J_{n+1/2}(kr)$$

where $J_{n+1/2}(kr)$: Bessel function of the first kind
k: wave number ($2\Pi/\lambda$)

r: distance component in polar coordinates $\varphi$n': derivative of $\varphi$n $$\zeta n(kr) = \varphi n(kr) + i \cdot \chi n(kr)$$

$$\chi n(kr) = -(\pi kr/2) \cdot N_{n+1/2}(kr)$$

where $N_{n+1/2}(kr)$: Bessel function of the second kind (Neumann function)
$\zeta$n': derivative of $\zeta$n
$\alpha = 2\Pi a/\lambda$
$\beta = N \cdot \alpha$ In a limit of $a/\lambda \gg 1$ of the above-described expression (8), the scattering cross section $\Phi$ is represented as:

$$\Phi = M\pi a_P^2 \quad (M \approx 2 \text{ when converging}) \quad (9)$$

Moreover, it is already understood from expression (8) that the above-described M oscillates within a range of: $1 < M < 6$ in a region of $2\Pi a_P/\lambda \approx 1$.

Here, states of the oscillations of M when the relative refractive index n is 1.1, 1.5 and 2.1 are shown in FIGS. 3A, 3B and 3C, respectively. From these graphs, it is understood that the scattering cross section $\Phi$ in the Mie scattering region comes to oscillate/converge owing to an increase of the particle diameter Dn. In this oscillation region also, it is possible to obtain, in a wide range where the relative refractive index n is approximately 1 to 2, a numeric value to be multiplied to the geometric scattering cross section $\Pi a_P^2$ in which the Mie scattering region converges, in response to the respective particle diameters from FIGS. 3A to 3C.

Results of obtaining a relationship between the particle diameter Dp and the scattering cross section $\Phi$ based on the above-described expressions (7) and (9) for each of some refractive indices n are shown in FIG. 4. Meanwhile, results of obtaining a relationship between the particle diameter Dp of the multi-particle system and an inverse number of a particle density to which a certain numeric value is multiplied, based on the Mie scattering theory by means of computer simulation, are shown in FIG. 5.

Note that such computer simulation is performed on the assumption that light having a certain limited angle of divergence is made incident onto optical mediums having cubic shapes with a variety of sizes from 10 mm cube to 1000 mm cube, which contain the particles therein. Specifically, the incident light and the size of the cube change analogically. Moreover, the particle diameter Dp is changed within a wide range from the Rayleigh scattering range to the Fresnel diffraction range. Moreover, in the computer simulation for the relationship, it is assumed that the light is emitted from a position opposite with an incident side thereof in the same direction as the incident light, and that light taking-out efficiency at ends of the cubes, from which the light is emitted, is approximately 80%.

From FIGS. 4 and 5, it is understood that there is an intimate relationship between the scattering cross section and the number of particles of the optical medium with the limited size.

<Lambert-Beer Law and Scattering Cross Section>

Following the Lambert-Beer law, transmittivity T where a parallel luminous flux is made incident onto an isotropic medium is represented as:

$$T = I/Io = \exp(-p \cdot x) \quad (10)$$

where x: distance
Io: intensity of incident light
I: intensity of emitted light
p: attenuation constant When the scattering cross section of the particles is $\Phi$, and the number of particles per unit volume, which are contained in the medium, is Np, the above-described attenuation constant ρ is conceived to be:

$$\rho = \Phi \cdot Np \cdot Kc \qquad (11)$$

Here, $K_C$ is a dimensionless correction coefficient empirically obtained when the light propagates through the optical medium of the limited space.

Moreover, parameters generally required in designing the light guide are the volume V of the optical medium, the number of mixed particles $N_{PT}$ and the particle diameter Dp, and how the intensity of the emitted light is changed in this case is examined.

Here, Np is represented as: $Np = N_{PT}/V$. Furthermore, $K_C$ is determined from comparison/analogy with the data in FIG. 4 and FIG. 5 and some data (not shown). In this calculation, Kc=0.004 was obtained from FIG. 4, FIG. 5 and some data (not shown). The particle diameter Dp and the scattering cross section $\Phi$ are associated with each other by expressions (7) and (9). Therefore, when the length of the optical medium in the optical axis direction is $L_G$, the light taking-out efficiency Eout is given by:

$$Eout = \exp\{-(\Phi \cdot Np \cdot L_G \cdot K_C)\} \qquad (13)$$

From this expression (13), it is understood that the taking-out efficiency can be made constant when $\Phi \cdot Np \cdot L_G$ is set equal to CONST. Specifically, it is satisfactory if Np is changed in response to the length $L_G$ of the optical medium in the optical axis direction.

Furthermore, in the case where no particles are present, when being represented by a loss coefficient $K_L$ obtained by synthesizing the shape of the cube, an intensity distribution of the incident light, a Fresnel loss depending on an incident angle, internal transmittivity and the like, the above-described expression (13) is transformed to:

$$Eout = \exp\{-(\Phi \cdot Np \cdot L_G \cdot K_C)\} \cdot K_L \qquad (14)$$

Specifically, the taking-out efficiency Eout can be determined by the scattering cross section $\Phi$ of the particles, the particle density Np, the length $L_G$ of the optical medium in the light propagation direction, the correction coefficient $K_C$ and the loss coefficient $K_L$. In other words, when desired light taking-out efficiency Eout is given, the light taking-out efficiency Eout is realized if the above-described expression (14) is satisfied.

<Fresnel Loss Factor>

With regard to the Fresnel loss, reflectivity is first considered. When a p-polarization component is Rp, and an s-polarization component is Rs, both are represented as:

$$Rp = \tan(\theta i - \theta r)/\tan(\theta i + \theta r) \qquad (15a)$$

$$Rs = -\sin(\theta i - \theta r)/\sin(\theta i + \theta r) \qquad (15b)$$

where θi: incident angle

θr: refraction angle

Therefore, intensity Ir of reflected light is obtained from expressions (15a) and (15b) as:

$$Ir = (Rp^2 + Rs^2)/2 \qquad (16)$$

From this expression (16), transmitted light intensity It is obtained as:

$$It = 1 - Ir \qquad (17)$$

When transmitted light intensity considering the intensity distribution of the incident light is It', expression (17) is transformed to:

$$It'(\theta i) = It(\theta i) \cdot D(\theta i) \qquad (18)$$

where D(θi): intensity distribution function

<Calculation of Fresnel Loss>

When a luminous flux having an arbitrary angle of divergence is incident onto the optical medium, the Fresnel loss is changed for the arbitrary incident angle θi. When the maximum incident angle of the luminous flux is θmax, the Fresnel loss on the boundary surfaces is represented as:

$$\int_0^{\theta\max} It(\theta i) \bullet D(\theta i) d\theta i \bigg/ \int_0^{\theta\max} D(\theta i) d\theta i \qquad (19)$$

Here, when it is assumed that the intensity distribution of the incident light has a rectangular shape for the purpose of simplifying the calculation, expression (19) is transformed to:

$$\int_0^{\theta\max} It(\theta i) d\theta i \bigg/ \int_0^{\theta\max} d\theta i \qquad (20)$$

Results of obtaining the Fresnel losses for the variety of refractive indices of the optical medium based on this expression (20) are shown in FIG. 6. Note that, in FIG. 6, the losses are shown by taking the transmittivity along an axis of ordinates. Specifically, transmittivity of 1 corresponds to a loss of 0.

<Calculation of Light Taking-Out Efficiency, Including Fresnel Loss>

From FIG. 6, it is understood that, in the case where the incident angle is 30° or less, even if the refractive index of the optical medium and the refractive index of the peripheral medium largely differ from each other, the Fresnel losses of both become substantially the same. Now, in the case where the optical medium is a sheet cuboid, it is conceived that a direction cosine of a light beam in the reflection/refraction is stored, and that the incident angle and the emitting angle become the same when no particles are present. Moreover, a product of the transmittivity of the incident surface and the transmittivity of the emitting surface becomes total transmittivity Ttotal when the transmittivities can be approximated to the internal transmittivity Tin≈1. Accordingly, when the refractive index of the optical medium is set as: n=1.5, Ttotal becomes equal to 0.92.

Therefore, expression (14) is transformed to:

$$Eout = \exp\{-(\Phi \cdot Np \cdot L_G \cdot K_C)\} 0.92 \qquad (14b)$$

Results of obtaining a relationship between the particle diameter and the light taking-out efficiency by means of this expression (14b) are shown in FIGS. 7A to 7E. Note that, when the intensity of the incident light has some distribution, and when the incident angle of the incident light is 30° or more, it is satisfactory if the Fresnel loss is obtained by expression (19) and expression (20) and assigned to expression (14b). However, it is desirable to set the divergence of the incident angle at approximately 30° by a half angle in consideration of a critical angle at the time of emission.

FIGS. 7A to 7E show, for light taking-out efficiencies as average targets of the respective particle diameters, which are first determined, calculated values (10 mmC, 100 mmC and 1000 mmC) in the respective particle diameters and results of a precise simulation (S 10 mm, S 100 mm and S 1000 mm) by the particle diameters and the densities for use in this calculation method. The light taking-out efficiencies as the Φ average targets are 80%, 70%, 60%, 50% and 40% in FIGS. 7A, 7B, 7C, 7D and 7E, respectively. The scattering cross section Φ is obtained according to the Rayleigh theory when the particle diameter is 20 nm, and according to the Mie theory when the particle diameter is 200 nm or more. Reference symbol S denotes the results of the simulation, and reference symbol C denotes the results of this calculation. Moreover, numeric values represent the lengths $L_G$ of the optical medium in the light propagation direction.

According to FIGS. 7A to 7E, it is understood that, when the light taking-out efficiencies as the average targets are 60% or more, errors from the results of the simulation remain within a range of less than 10%, and that both coincide well with each other. Specifically, in other words, FIGS. 7A to 7E show that the errors remain within the range of less than 10% when the value of $\Phi \cdot Np \cdot L_G \cdot K_C$ is 0.4 or less. Moreover, FIGS. 7A to 7E simultaneously show that the errors remain within a range of less than 50% even if the above-described value is 0.9 or less. Note that 0.92, which is an empirically obtained value, is used as the value of $K_L$. In terms of performing the simulation and trials, it is conceived that no particular problem occurs for the purpose of setting the targets for the light taking-out efficiencies even if the errors of approximately 50% occur. Needless to say, it is not necessary to perform the simulation when the errors are less than 10%. Moreover, it becomes unnecessary to evaluate several kinds of samples and draw candidates therefrom. Accordingly, an effect that development efficiency is improved is obtained.

From the results described above, it is conceived possible to obtain a good solution for the light taking-out efficiency by use of expression (14) based on the results of the Rayleigh region and the Mie scattering converging region, which are relatively simple, without relying on the complicated theory of the Mie scattering. This method is that which has been created in consideration of this finding. As described above, the desired light taking-out efficiency Eout is realized by satisfying the following expression:

$$E\text{out} = \exp\{-(\Phi \cdot Np \cdot L_G \cdot K_C)\} \cdot K_L$$

<Calculation Example>

Results of performing the calculation for the sheet cuboid based on expression (14) are shown in Tables 1 to 3 and FIGS. 8A to 8C. Note that it is FIG. 8A that shows numeric values of Table 1 in a graph, and in a similar manner, Table 2 and Table 3 correspond to FIG. 8B and FIG. 8C, respectively. In the calculation results in these Tables, any of the values of $\Phi \cdot Np \cdot L_G \cdot K_C$ is 0.9 or less. Note that, in all of the cases, a value of $K_L$ is 0.92.

TABLE 1

Eout = 0.8

| Particle diameter (nm) | Scattering cross section ($m^2$) | Particle density (pieces/$mm^3$) | W × T × $L_G$ (mm) | Taking-out efficiency, expression (14) (%) | Taking-out efficiency, SIM (%) |
|---|---|---|---|---|---|
| 20 | $1.1 \times 10^{-22}$ | $1.0 \times 10^{13}$ | 4 × 1 × 20 | 84 | 87 |
| | | $2.5 \times 10^{12}$ | 16 × 1 × 80 | | 88 |
| | | $6.3 \times 10^{11}$ | 64 × 1 × 320 | | 88 |
| 200 | $1.5 \times 10^{-14}$ | $3.0 \times 10^{7}$ | 4 × 1 × 20 | 89 | 89 |
| | | $7.5 \times 10^{6}$ | 16 × 1 × 80 | | 89 |
| | | $1.9 \times 10^{8}$ | 64 × 1 × 320 | | 89 |
| 2000 | $12.6 \times 10^{-12}$ | $3.0 \times 10^{5}$ | 4 × 1 × 20 | 68 | 75 |
| | | $7.5 \times 10^{4}$ | 16 × 1 × 80 | | 76 |
| | | $1.9 \times 10^{4}$ | 64 × 1 × 320 | | 76 |
| 20000 | $6.3 \times 10^{-10}$ | $3.0 \times 10^{3}$ | 4 × 1 × 20 | 79 | 86 |
| | | $7.5 \times 10^{2}$ | 16 × 1 × 80 | | 86 |
| | | $1.9 \times 10^{2}$ | 64 × 1 × 320 | | 86 |
| 200000 | $6.3 \times 10^{-8}$ | $3.0 \times 10^{1}$ | 4 × 1 × 20 | 79 | 90 |
| | | $7.5 \times 10^{0}$ | 16 × 1 × 80 | | 90 |
| | | $1.9 \times 10^{0}$ | 64 × 1 × 320 | | 90 |

Cuboid(Sheet) Note) SIM: simulation

TABLE 2

Eout = 0.7

| Particle diameter (nm) | Scattering cross section ($m^2$) | Particle density (pieces/$mm^3$) | W × T × $L_G$ (mm) | Taking-out efficiency, expression (14) (%) | Taking-out efficiency, SIM (%) |
|---|---|---|---|---|---|
| 20 | $1.1 \times 10^{-22}$ | $2.0 \times 10^{13}$ | 4 × 1 × 20 | 78 | 82 |
| | | $5.0 \times 10^{13}$ | 16 × 1 × 80 | | 83 |
| | | $1.3 \times 10^{12}$ | 64 × 1 × 320 | | 83 |
| 200 | $1.5 \times 10^{-14}$ | $6.0 \times 10^{7}$ | 4 × 1 × 20 | 85 | 85 |
| | | $1.5 \times 10^{7}$ | 16 × 1 × 80 | | 85 |
| | | $3.8 \times 10^{6}$ | 64 × 1 × 320 | | 84 |

TABLE 2-continued

Eout = 0.7

| Particle diameter (nm) | Scattering cross section (m$^2$) | Particle density (pieces/mm$^3$) | W × T × L$_G$ (mm) | Taking-out efficiency, expression (14) (%) | Taking-out efficiency, SIM (%) |
|---|---|---|---|---|---|
| 2000 | 12.6 × 10$^{-12}$ | 4.5 × 10$^5$ | 4 × 1 × 20 | 59 | 65 |
|  |  | 1.1 × 10$^5$ | 16 × 1 × 80 |  | 65 |
|  |  | 2.8 × 10$^4$ | 64 × 1 × 320 |  | 58 |
| 20000 | 6.3 × 10$^{-10}$ | 4.5 × 10$^3$ | 4 × 1 × 20 | 73 | 79 |
|  |  | 1.1 × 10$^3$ | 16 × 1 × 80 |  | 79 |
|  |  | 2.8 × 10$^2$ | 64 × 1 × 320 |  | 70 |
| 200000 | 6.3 × 10$^{-8}$ | 4.5 × 10$^1$ | 4 × 1 × 20 | 73 | 86 |
|  |  | 1.1 × 10$^1$ | 16 × 1 × 80 |  | 86 |
|  |  | 2.8 × 10$^0$ | 64 × 1 × 320 |  | 78 |

Cuboid(Sheet) Note) SIM: simulation

TABLE 3

Eout = 0.6

| Particle diameter (nm) | Scattering cross section (m$^2$) | Particle density (pieces/mm$^3$) | W × T × L$_G$ (mm) | Taking-out efficiency, expression (14) (%) | Taking-out efficiency, SIM (%) |
|---|---|---|---|---|---|
| 20 | 1.1 × 10$^{-22}$ | 3.2 × 10$^{13}$ | 4 × 1 × 20 | 70 | 78 |
|  |  | 8.0 × 10$^{12}$ | 16 × 1 × 80 |  | 79 |
|  |  | 2.0 × 10$^{12}$ | 64 × 1 × 320 |  | 79 |
| 200 | 1.5 × 10$^{-14}$ | 1.2 × 10$^8$ | 4 × 1 × 20 | 79 | 78 |
|  |  | 3.0 × 10$^7$ | 16 × 1 × 80 |  | 78 |
|  |  | 7.5 × 10$^6$ | 64 × 1 × 320 |  | 77 |
| 2000 | 12.6 × 10$^{-12}$ | 9.0 × 10$^5$ | 4 × 1 × 20 | 37 | 41 |
|  |  | 2.3 × 10$^5$ | 16 × 1 × 80 |  | 40 |
|  |  | 5.6 × 10$^4$ | 64 × 1 × 320 |  | 36 |
| 20000 | 6.3 × 10$^{-10}$ | 9.0 × 10$^3$ | 4 × 1 × 20 | 59 | 60 |
|  |  | 2.3 × 10$^3$ | 16 × 1 × 80 |  | 60 |
|  |  | 5.6 × 10$^2$ | 64 × 1 × 320 |  | 52 |
| 200000 | 6.3 × 10$^{-8}$ | 9.0 × 10$^1$ | 4 × 1 × 20 | 59 | 73 |
|  |  | 2.3 × 10$^1$ | 16 × 1 × 80 |  | 73 |
|  |  | 5.6 × 10$^0$ | 64 × 1 × 320 |  | 64 |

Cuboid(Sheet) Note) SIM: simulation

In FIGS. 8A and 8C, lines denoted by reference symbols (C) and (S) represent the results of this calculation and the precise simulation, respectively. Moreover, numeric values represent dimensions (mm) of the optical mediums. Furthermore, the light taking-out efficiencies as the targets are set at the averages in the respective particle diameters. As apparent from Tables 1 to 3 and FIGS. 8A to 8C, it is understood that the results of this calculation and the results of the simulation coincide well with each other. In particular, the results for the case in which the particle diameter is 2000 nm make it far more apparent that this calculation method coincides with the simulation.

<Distribution Characteristics of Emitted Light Intensity>

Distribution characteristics of emitted light intensity are affected by an intensity distribution of light from light sources, an angle of divergence thereof, the number and location of the light sources and the like, and were accordingly evaluated by the simulation. The distribution characteristics of the emitted light intensity for each particle diameter, which were thus obtained, are shown in FIGS. 9A, 9B and 9C. Here, it is assumed that the light source is located at a center of an incident-side cross section of the optical medium, and the angle of divergence is set at 30° by a half angle. FIGS. 9A, 9B and 9C show results of performing the simulation for the case of the sheet cuboids under the same conditions as in Table 1, and show the results of the cases where sheet sizes thereof are small, medium and large, respectively.

From these graphs, it is understood that substantially even intensity distributions are realized at approximately 90% of the light taking-out efficiency in the optical mediums of which cross sections are rectangular. From the above consideration and the computer simulation, when the light guide is manufactured by mixing the particles generating the light scattering into the arbitrary optical medium, first, based on expression (14), the light taking-out efficiency can be drawn in advance from the scattering cross section, the particle density, the dimension of the optical medium and the like according to each particle diameter. Furthermore, the distribution characteristics of optical intensity may be obtained by the precise simulation. Alternatively, it is also possible to make several kinds of samples according to the conditions drawn in advance from expression (14), and to experimentally evaluate the samples.

Moreover, if the sheet light guide for use in the present invention is configured to satisfy the relationship of: $\Phi \cdot Np \cdot L_G \cdot K_C \leq 0$ as described above, then the errors from the results of the simulation remain within the range of less than 10%. Therefore, good light taking-out efficiency and an even intensity distribution of the emitted light can be realized.

Moreover, the sheet light guide for use in the present invention is that which propagates light therethrough while making the light repeatedly scatter by the particles in the optical medium. Accordingly, both of the following are possible in a similar way: one is to make the light incident from one end surface and to propagate the light to the other end surface; and the other is to make the light incident from the above-described other end surface and to propagate the light to the above-described one end surface. Accordingly, it becomes possible for a communication system using the sheet light guide of the present invention to perform two-way communication.

<Necessary Condition for Communication System Using Sheet Light Guide>

A typical sheet light guide for communication is shown in FIG. 10. As described above, a sheet light guide 10 is that which is formed by containing the light-scattering particles in the optical medium such as, for example, polymethyl-methacrylate (PMMA), and propagates light incident from one end surface to the other end surface side while scattering the light by the particles. Moreover, a plurality of optical fibers 21, 22 and 23 are connected to the one end surface of the sheet light guide 10, and optical fibers 31, 32 and 33 are connected to the other end surface. To the optical fibers 21 to 23 and 31 to 33, in usual, ones with large numerical apertures (N.A.) are applied, thus enabling the two-way communication.

Conditions in the case of receiving light by the optical fibers are considered. According to the paper "High-Uniformity Star Coupler Using Diffused Light Transmission" IEICE TRANS. ELECTRON, Vol. E84C, No. Mar. 3, 2001 p. 339, requirements for a photodetector in a sheet light guide system for communication are as follows.

<<20.5 dBm (0 dBM=1 mW) or more is required as minimum received optical power of photodetector>>

This is calculated from a Bit-Error-Rate (BER) in the case of transmitting/receiving a signal of 500 Mbps. Moreover, the photodetector is a PIN photodiode, and accordingly, this condition is not helpful in the case where the photodetector is different (for example, photomultiplier, avalanche photo-diode and the like), or in the case where a transmission band is different. Specifically, in an arbitrary photodetector, the minimum received optical power which is acceptable in a certain transmission band should be present. Thus, the acceptable minimum received optical power of the photo-detector, which satisfies the above-described condition, is defined as P(Receiver)min.

First, constraints in the case where the intensity distribution of the emitted light of the sheet light guide is flat are obtained from the above-described condition. Even if the intensity distribution of the emitted light is flat, in one optical fiber, an area ratio $f/4$ of the light guide path and the optical fiber in cross section necessarily lead to a loss. However, it is assumed that a core diameter of the optical fiber is equal to the thickness of the sheet light guide. Moreover, a tolerance is not considered at present.

When the number of branches (number of nodes) is N, the optical power is lowered to 1/N, and $f/4$ of the lowered optical power is counted as a loss. Then, the optical power P (Receiver) received by the photodetector in an ideal case is represented as:

$$P(\text{Receiver}) = E_{out} \cdot (1/N) \cdot \pi/4 \qquad (21)$$

Here, it is assumed that the photodetector receives all the emitted light from the optical fiber. Thus, when optical power incident onto the light guide is Pin, expression (21) is transformed to:

$$P(\text{Receiver}) = P_{in} \cdot E_{out} \cdot (1/N) \cdot \pi/4 \qquad (22)$$

When a logarithm of this expression (22) is taken, the received optical power of the photodetector, which is represented by dBm, is established as:

$$P(\text{Receiver})_{dBm} = -10 \text{Log} \{ P_{in} \cdot E_{out} \cdot (1/N) \cdot \pi/4 \} \qquad (23)$$

A relationship between the received optical power and the number of branches (number of nodes) is shown in FIG. 11 for the cases where the incident optical power is 1 mW and 10 mW. As understood from FIG. 11, naturally, the received optical power is proportional to the optical power of emitted light. Moreover, though it is assumed here that the intensity distribution of the light emitted from the sheet light guide is a flat one, actually, when the position of the light source is changed, the intensity distribution of the emitted light is also changed. Specifically, it is conceived that fluctuations occur in the received optical power, and that the received optical power becomes the minimum at a portion where the intensity of incident light is the minimum.

Here, when the optical power Pin of light incident onto the light guide is given, a distribution profile of the emitted light when the light source is at an arbitrary position is represented by a normalization intensity distribution function D(x, y), in which a direction where the intensity distribution of the emitted light is on a long side is taken as x, and a direction where the intensity distribution thereof is on a short side is taken as y. Moreover, one unit in incident and emitting portions divided by the number of branches (number of nodes) is referred to as a segment, and it is assumed that the center (optical axis) of the optical fiber is ideally positioned at the center of each segment.

Therefore, when Segi is an integration region in an i-th segment, a mean value NPi in which the optical power of emitted light is normalized in the i-th segment is represented as:

$$NPi = \int_{Segi} D(x, y) dx dy \Big/ \int_{Seg\,max} D(x, y) dx dy \qquad (24)$$

Here, Segmax denotes a segment in which the optical power becomes the maximum among all the segments. Moreover, in a segment in which the optical power becomes the minimum, NPi is represented as:

$$NPi(\min) = \int_{Seg\,min} D(x, y) dx dy \Big/ \int_{Seg\,max} D(x, y) dx dy \qquad (25)$$

In expression (23), the entire optical power of emitted light Pout is represented as:

$$P_{out} = P_{in} \cdot E_{out} \qquad (26)$$

From this relationship, with regard to the optical power PSegi in the i-th segment, the number of branches, the number of segments and the number of nodes are equal to one another. Accordingly, PSegi is represented as:

$$PSegi = Pout \bullet \left\{ NPi \bigg/ \sum_{i=1}^{n} NPi \right\} \quad (27)$$

Note that, in this specification, for the sake of convenience, the following included in the above-described expression (27) is described as $\Sigma NPi$:

$$\sum_{i=1}^{n} NPi$$

The above-described expression (23) and expression (27) are combined, and $1/N$ in the case where the intensity distribution of the emitted light is flat is replaced by $\Sigma NPi$. Then, the following expression is established:

$$P(\text{Receiver})_{dBm} = -10 \text{Log}\{Pin \cdot Eout \cdot (NPi/\Sigma NPi) \cdot \pi/4\}$$

A value necessary at present is that in the case where the optical power emitted from the optical fiber is the minimum, which is then given by expression (25). Specifically, when $P(\text{Receiver\_min})_{dBm}$ is the minimum optical power received by the photodetector, $P(\text{Receiver\_min})_{dBm}$ is obtained, from the above-described expression, as:

$$P(\text{Receiver\_min})_{dBM} = -10 \text{Log}\{Pin \cdot Eout \cdot (NPi(\min)/\Sigma NPi) \cdot \pi/4\} \quad (28)$$

where Pin: incident optical power
Eout: light taking-out efficiency
NPi (min): optical power of segment in which optical power becomes minimum
$\Sigma NPi$: sum of optical powers of segments Moreover, when the minimum optical power required for the photodetector in order to satisfy a certain BER is $PRmin_{dBm}$, the following relationship is established:

$$PRmin_{dBm} \leq P(\text{Receiver\_min})_{dBm}$$

Furthermore, when a coupling loss of a light emitter and the optical fiber is $K_E$, a coupling loss of the optical fiber and the sheet light guide is $K_F$, a coupling loss of the optical fiber and the photodetector is $K_R$, and an internal loss of the optical fiber $K_{FT}$, $PRmin_{dBm}$ is represented as:

$$PRmin_{dBm} \leq P(\text{Receiver\_min})_{dBm} K_E \cdot K_F \cdot K_R \cdot K_{FI} \quad (29)$$

This expression (29) becomes the necessary condition for the communication system using the sheet light guide.

<BER (Bit-Error-Rate)>

The BER is an index indicating how much difference occurs between an original digital signal randomly generated and a received digital signal as a result of transmitting the digital signal through a certain communication medium. When the number of transmitted bits is Bits and the number of bit errors is Biter, the BER is represented as:

$$BER = Biter/Bits \quad (30)$$

Next, a mechanism of the bit error generation is considered. First, a distortion of an analog waveform when an analog signal is converted into a digital signal is mentioned as a first factor. Moreover, the bit error is increased when a signal level is lowered, and accordingly, it is also necessary to consider S/N as a factor. Even if the signal level is lowered owing to the distortion of the waveform, the bit error should not occur when the signal level stably exceeds a threshold value for distinguishing (0, 1) signals. When noise comes flying in from the exterior or occurs in the interior of the system to give a level change to the distorted waveform, such a phenomenon is conceived to become a cause of the bit error (refer to FIG. 12).

The maximum factor of the waveform distortion in the communication system using the sheet light guide is conceived to be a distortion of a received signal itself in which an arbitrary incident segment and an emitted segment correspond to each other, and a waveform distortion owing to a phase shift of each signal component included in a mixing signal corresponding to each incident segment and an arbitrary emitted segment. Moreover, the above-described waveform distortion results from an optical path difference of signal light. Elements causing the optical path difference in the communication system using the optical fibers and the sheet light guide are the sheet light guide itself and the optical fibers. Specifically, the bit error is estimated to occur because the signal level is lowered than a predetermined threshold value by the waveform distortion when the analog signal is converted into the digital signal. Furthermore, when it is assumed that the digital signal is accompanied by a reference signal (reference clock) when being transmitted, and that the digital signal is collated with the reference signal also when being read, it is conceived that the bit error occurs when the phase difference (jitter) is increased between the reference signal and the digitized signal. Moreover, an analog signal in the vicinity of the threshold value fluctuates with respect to the threshold value owing to fluctuations by the noise, and is converted into an erroneous digital signal. Specifically, the bit error is conceived to occur because the factor of the optical path difference and the factor of the noise are combined.

<Relationship Between Optical Path Difference and Bit-Error-Rate (BER)>

Waveform distortions for the respective numbers of nodes, which are 4, 8 and 16, in the communication systems each using the sheet light guide, are shown in FIGS. 13A and 13B (4 nodes), FIGS. 14A and 14B (8 nodes), and FIGS. 15A and 15B (16 nodes). In these communication systems, an outer diameter of each optical fiber is 1 mm, and a length thereof is 1 m, in which case the optical path difference is negligible. The optical fibers are provided in parallel while being brought into intimate contact with one another on both the light incident side and the light emitting side.

Moreover, numeric values of "In" and "Out" in each graph represent a light incident position and a light emitting position by distances from a center position of the sheet light guide in the direction where the optical fibers are arrayed. The distances are represented by mm, and positions on a side where the optical fibers onto which the light is made incident are present are denoted by negative symbols (−), and positions on the other side are denoted by positive symbols (+). Specifically, FIG. 13A shows a waveform distortion in the case where the light is made incident onto an optical fiber having a center at a position of −1.5 mm from the above-described center position, that is, the second optical fiber from the center position in the negative direction and the light is emitted from an optical fiber having a center at the same position. FIG. 13B shows a waveform distortion in the case where the light is made incident onto the optical fiber at the same position and the light is emitted from an optical fiber having a center at a position of +1.5 mm from the above-described center position, that is, a second optical fiber from the center position in the positive direction. Moreover, FIG. 14A shows a waveform distortion in the case where the light is made incident onto an optical fiber having a center at a position of −3.5 mm from the above-described center position, that is, a fourth optical fiber from the center position in the negative direction and the light is emitted from an optical fiber having a center at the same position. FIG. 14B shows a waveform in the case where the light is made incident onto the optical fiber having the center at the same position and the light is emitted from an optical fiber having a center at a position of +3.5 mm from the center position, that is, a fourth optical fiber from the center position in the positive direction. Furthermore, FIG. 15A shows a waveform distortion in the case where the light is made incident onto an optical fiber having a center at a position of −7.5 mm from the above-described center position, that is, an eighth optical fiber from the center position in the negative direction and the light is emitted from an optical fiber having a center at the same position. FIG. 15B shows a waveform in the case where the light is made incident onto the optical fiber at the same position as described above and the light is emitted from an optical fiber having a center at a position of +7.5 mm from the above-described center position, that is, an eighth optical fiber from the center position in the positive direction.

From these graphs, it is understood that the level change owing to the waveform distortion is negligible in the case that an input signal is 1 Gbps.

<Relationship Between S/N and BER>

It is conceived that an occurrence of erroneous reading (bit error) is also associated with quality of the signal, that is, S/N. Specifically, even if main components from which harmonic components are removed are separated in signal spectra adjacent to one another, if the harmonic components (noise components) are large, signals cannot be distinguished as individual signals. Supposing an extreme case, it is conceived that it is usually impossible to detect such a signal embedded in the noise components unless the signal is particularly subjected to filtering processing.

As the noise component, there is extraneous noise such as radiation noise and induction noise, in addition to noise occurring in the inside of the system, such as thermal noise (Johnson Noise), quantum noise (Shot Noise), 1/f noise intrinsic to a semiconductor device for use in the light emitter and the photodetector. Here, for the purpose of evaluating performance of the system itself, the extraneous noise is ignored, and only the noise occurring in the interior of the system is only considered. Moreover, an influence of the 1/f noise is ignored.

Power (Noise(Total)) of the noise components is represented as:

$$Noise(Total) = Noise\ (heat) + Noise\ (quantum) \quad (31)$$

When each component is written by the power for a photodetection element:

$$Noise(heat) = (4kT/R) \cdot \Delta v \quad (31a)$$

where k: Planck's constant
T: equivalent temperature (determined by noise factor)
R: load resistance of photodetector
Δv: band of photodetector $$Noise(quantum) = 3e^2 \cdot (P + P_B) \cdot \eta \cdot \Delta v / (hv) + 2ei_d \cdot \Delta v \quad (31b)$$

where e: charge of electrons
P: optical power of signal light
$P_B$: optical power of background light
η: quantum efficiency
h: Planck's Constant
v: frequency of signal light
$i_d$: dark current
Δv: band of photodetector Here, it is considered to rectify a signal of 0.25 GHz, of which output is not lowered, when a signal of 0.5 Gbps is made. Specifically, the band of the photodiode is 0.25 GHz. In this case, as an example, for a Si-photodiode: S5973 made by Hamamatsu Photonix K.K., the noise components are calculated where P=8.9×10$^{-6}$W (20.5 dBm), η=0.4, R=50Ω, and T=300 K. The calculated values converted into current values become:

$$Noise\ (thermal\ rms) = 2.88 \times 10^{-7}(A)$$

$$Noise\ (quantum\ rms) = 8.19 \times 10^{-8}(A)$$

The total noise component becomes:

$$Noise\ (total\ rms) = 3.70 \times 10^{-7}(A) \quad (32)$$

Meanwhile, a signal current Sc in the minimum received optical power is given by:

$$Sc = P \cdot e \cdot \eta / (h \cdot v) \quad (33)$$

Accordingly, a signal current S (min) c at the minimum received optical power becomes:

$$S(min)c = 2.46 \times 10^{-6}(A)$$

Therefore, a signal-to-noise ratio (S/N) in this case becomes:

S/N(Pmin)=6.65.

Incidentally, the thermal noise is dominant over the distribution of the noise. Accordingly, when the thermal noise is approximated by Gaussian, a probability of occurrence of noise Pr(S/N=1) in the case where the system noise at certain timing becomes 6.65 times the rms noise, that is, in the case where a signal current level becomes equal to a noise current level (S/N=1) becomes:

$$Pr(S/N=1) \approx 3.47 \times 10^{-11}$$

The probability becomes a value approximate to BER≈1× 10$^{-11}$, and becomes a value approximate to a probability of occurrence of the BER of the above-described U.S. Pat. No. 5,548,670. Furthermore, in the case of using a high-pass filter of approximately 20 MHz, which causes no trouble in transmission of the digital signal, the following are obtained:

$$S/N(Pmin) = 6.81$$

$$Pr(S/N=1) \approx 1.31 \times 10^{-11}$$

These substantially coincide with those described in "High-Uniformity Star Coupler Using Diffused Light Transmission" IEICE TRANS. ELECTRON, Vol. E84C, No. 3, Mar. 2001 p. 339. Specifically, the above-described results constitute grounds for considering that the conventional assumption regarding the BER is correct. Note that, in FIG. 16, a relationship between a magnitude of the root mean square (rms) noise and a probability of occurrence thereof is shown.

Furthermore, the assumption regarding the BER is further advanced, and a more practical technique is considered. First, typical rms noise (voltage value) in the communication system using the sheet light guide is measured, and the Noise (System_rms) is defined. Moreover, when the BER acceptable in the system is defined as BER (accept) and power of a photodetection signal is defined as PRmin, a signal voltage S (PRmin) v is represented as:

$$S(PRmin)v = PRmin \cdot e \cdot \eta/(h \cdot v) \times R \qquad (34)$$

where R is a load resistance.

Moreover, a level of the threshold value of the (0, 1) signal is defined as V (Thresh), and S/N (Thresh) considering the level of the threshold value is defined by:

$$S/N(\text{Thresh}) = \{S(PRmin)v - V(\text{Thresh})\}/\text{Noise(System\_rms)} \qquad (35)$$

When expression (35) reaches a certain value, the BE occurs at a certain probability, which is defined as S/Naccept. In this case, from the above-described consideration, it is conceived that the probability of occurrence of the Noise(System_rms) is equal to the BER. FIG. 17 shows a relationship between the BER calculated based on the above-described consideration and the received optical power. This relationship is very approximate to the result of the actual measurement of "High-Uniformity Star Coupler Using Diffused Light Transmission" IEICE TRANS. ELECTRON, Vol. E84C, No. 3, Mar. 2001 p. 339, and a shape thereof is also very analogous to that thereof.

Considering the V(Thresh), the BE occurs when a value obtained by subtracting the noise component from the signal component is lowered than the V(Thresh) or when a value obtained by adding the noise component to the "0" level exceeds the V(Thresh). Therefore, it is desirable that the V(Thresh) be set at a half value of an average signal voltage.

From the above, in the communication system using the sheet light guide, a communication system configured in the following manner can be defined. When the acceptable BER, that is, BER (accept) is given, and the rms noise of the system is defined as the Noise (System_rms), the probability of occurrence Pr (Noise (System_rms)) of the Noise (System_rms) is Noise (Systme_rms) of a magnitude which satisfies the following in a band where it is not necessary to consider the distortion of the signal waveform:

$$Pr(\text{Noise(System\_rms)} \cdot Q) \leq BER(\text{accept}) \qquad (36)$$

where Q is a proportionality constant.

When an arbitrary threshold value V (Thresh) in binarization is given, the signal level is of the input signal PRmin which satisfies:

$$\{S(PRmin)v - V(\text{Thresh})\} > \text{Noise (System\_rms)} \cdot Q \qquad (37)$$

Moreover, the signal level is of the signal voltage S(PRmin)v outputted through a load resistor from a photodetector which satisfies expression (37).

Alternatively, for the above-described reason, the above-described expression (37) can also be defined as:

$$S(PRmin)v/2 > \text{Noise(System\_rms)} \cdot Q \qquad (38)$$

Furthermore, such a circuit configuration as capable of measuring the BER in the inside of the system is provided, the output power PRmin of the light source is adjusted so as to satisfy the BER(accept), and thus expression (37) and expression (38) may be satisfied. In this case, a digital circuit which makes feedback from the BER measurement circuit to the light source side is provided, and this digital circuit is made as one which controls the optical power of the light source according to a table determined based on the BER (accept). Thus, the digital circuit becomes capable of also coping with the extraneous noise other than the Noise (System_rms) generated by the system itself.

BRIEF DESCRIPTION OF THE DRAWINGS

FIG. 3C is a graph showing a state where the scattering cross section oscillates when the relative refractive index is 2.1 in the Mie theory.

FIG. 4 is a graph showing results on a relationship between a particle diameter and the scattering cross section obtained by computer simulation for each of some refractive indices.

FIG. 5 is a graph showing results on a relationship between a particle diameter of a multi-particle system and an inverse number of a particle density obtained by the computer simulation.

FIG. 6 is a graph showing Fresnel losses for a variety of refractive indices of an optical medium.

FIG. 7A is a graph showing the comparisons of results on a relationship between the particle diameter and light taking-out efficiency, obtained by a method of the present invention and the computer simulation (light taking-out efficiency of 80% is targeted).

FIG. 7E is a graph showing the comparisons of results on a relationship between the particle diameter and light taking-out efficiency, obtained by the method of the present invention and the computer simulation with each other (light taking-out efficiency of 40% is targeted).

FIG. 9C is a graph showing the distribution characteristics of the emitted light in the sheet light guide when the sheet size is large.

FIG. 12 is an explanatory view explaining the cause of an occurrence of a bit error.

FIG. 13A is a graph showing an example of a waveform distortion in a signal light in a communication system using the sheet light guide, of which number of nodes is four.

FIG. 13B is a graph showing another example of the waveform distortion in the signal light in the communication system using the sheet light guide, of which number of nodes is four.

FIG. 16 is a graph showing a relationship between a magnitude of root mean square (rms) noise and a probability of occurrence thereof.

FIG. 17 is a graph showing a relationship between a Bit-Error-Rate (BER) and the received optical power.

DESCRIPTION OF THE PREFERRED EMBODIMENT

Embodiments of the present invention will be described below in detail with reference to the drawings.

Figure 1:
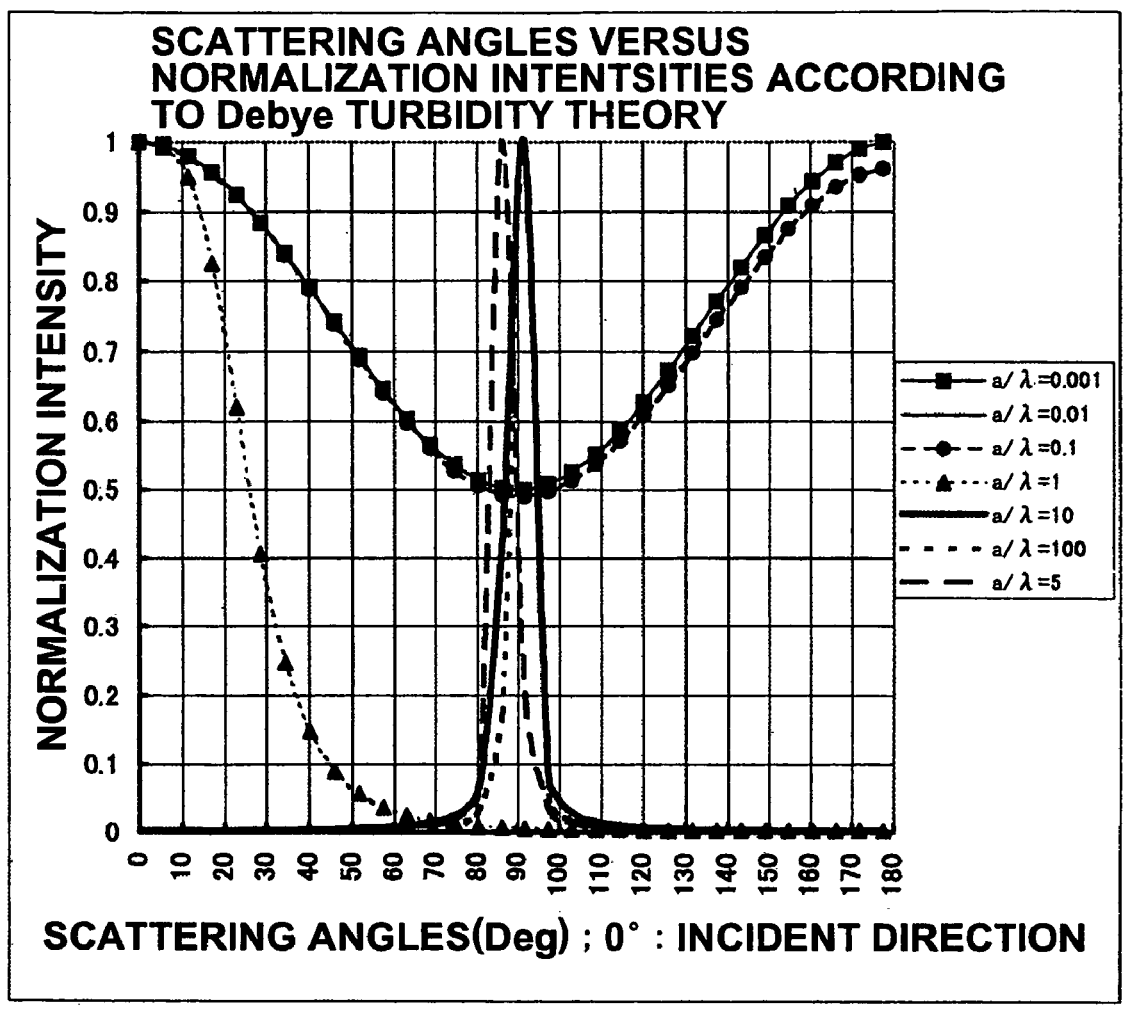
FIG. 1 is a graph showing scattering angles versus normalization intensities following the Debye turbidity theory.
Figure 2:
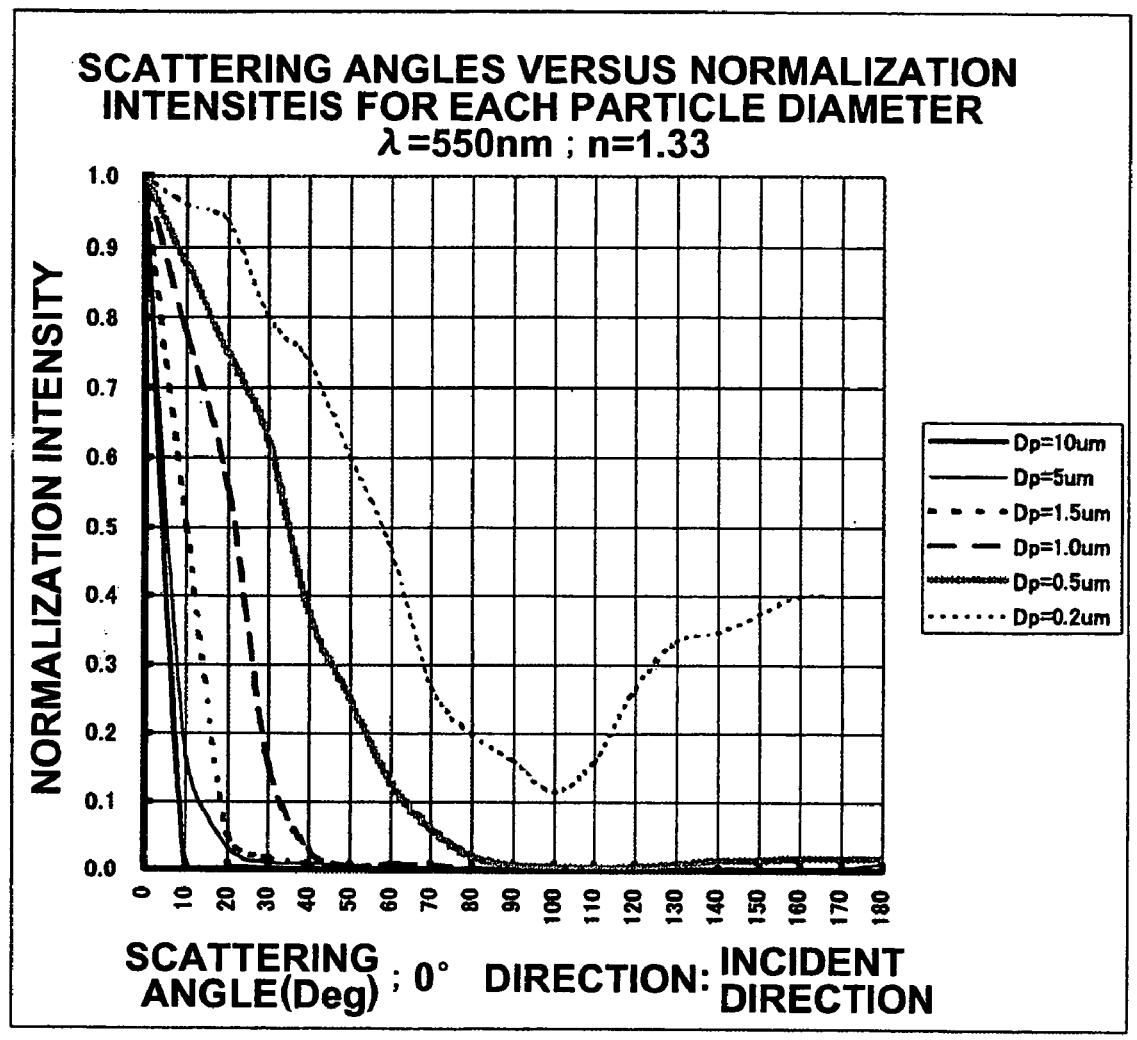
FIG. 2 is a graph showing scattering angles versus normalization intensities following the Mie scattering theory.
Figure 3A:
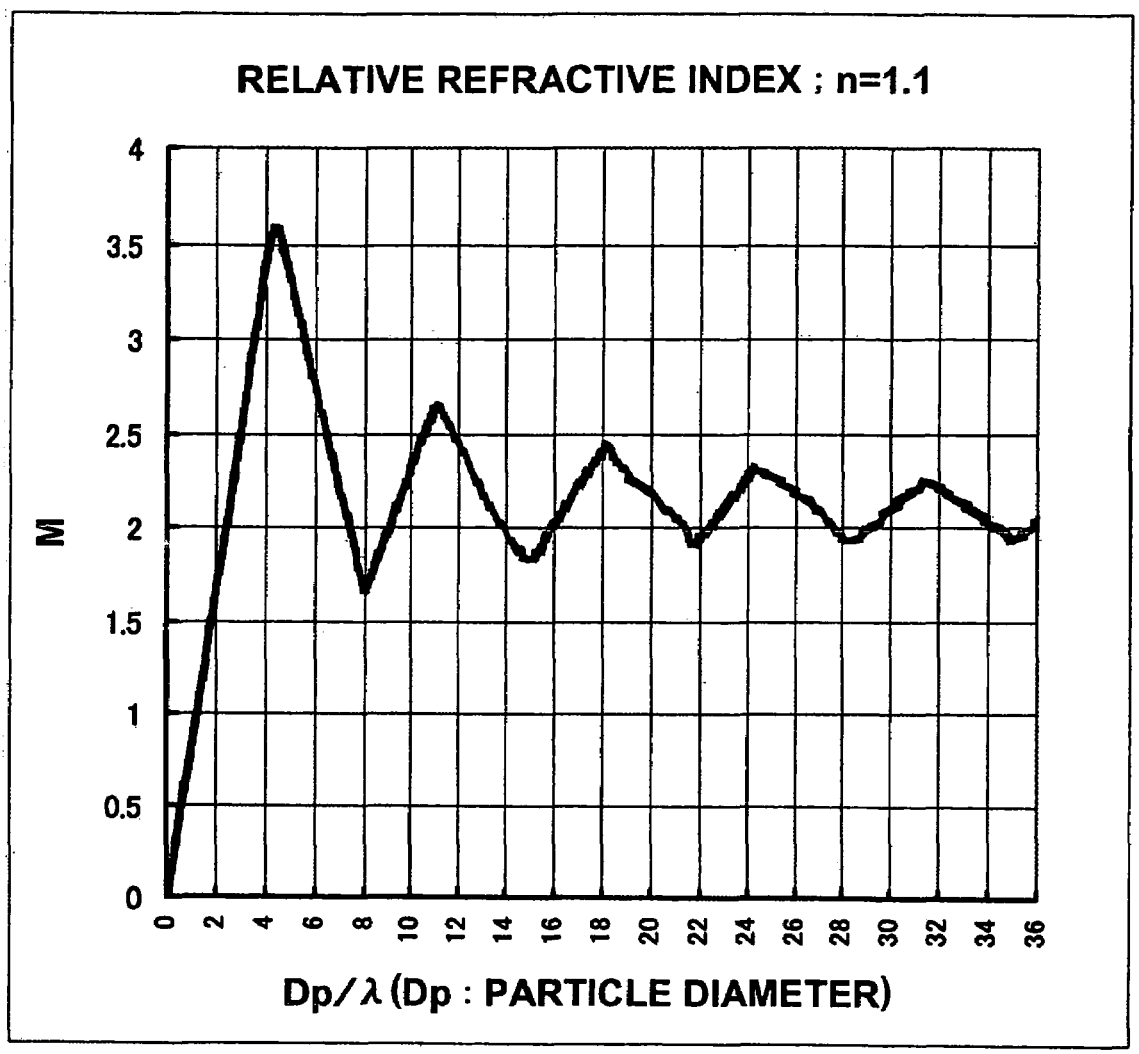
FIG. 3A is a graph showing a state where a scattering cross section oscillates when a relative refractive index is 1.1 in the Mie theory.
Figure 3B:
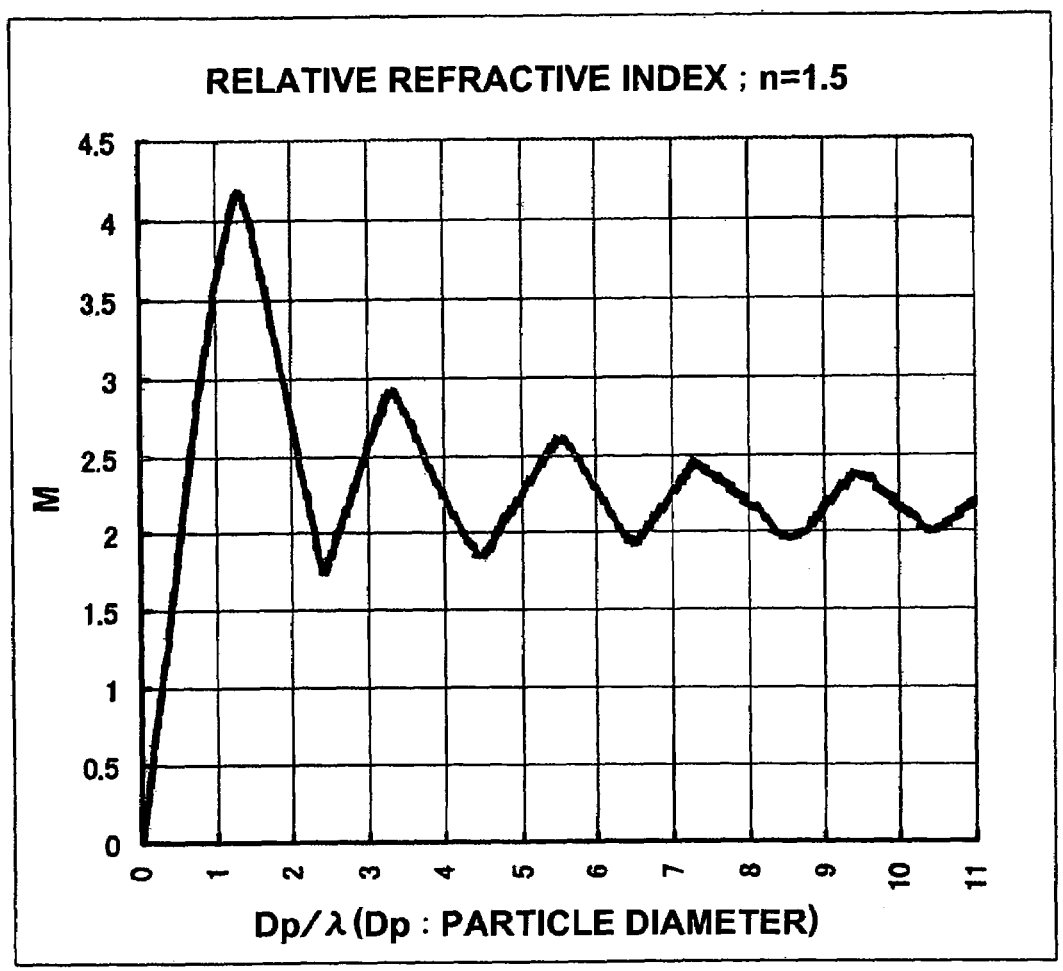
FIG. 3B is a graph showing a state where the scattering cross section oscillates when the relative refractive index is 1.5 in the Mie theory.
Figure 7B:
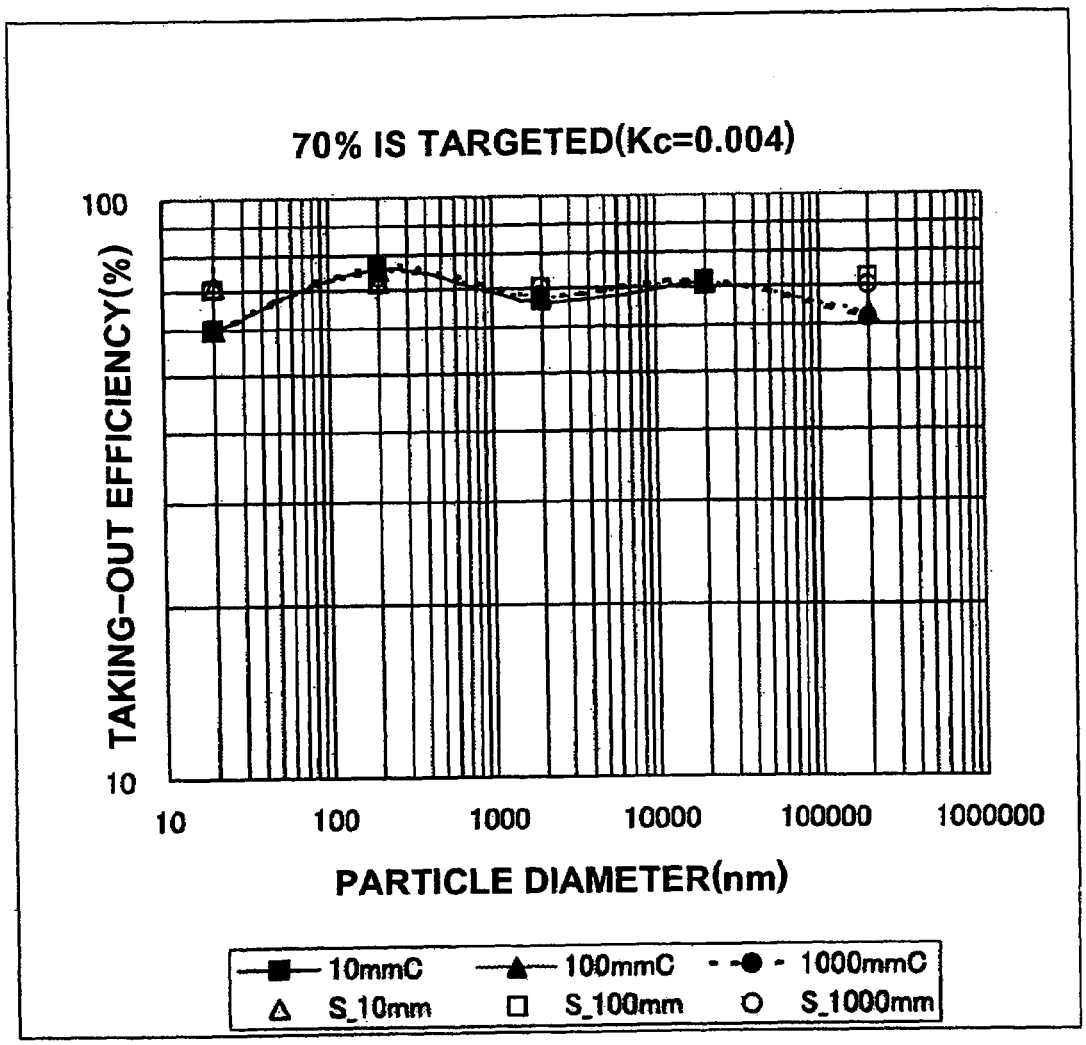
FIG. 7B is a graph showing the comparisons of results on a relationship between the particle diameter and light taking-out efficiency, obtained by the method of the present invention and the computer simulation with each other (light taking-out efficiency of 70% is targeted).
Figure 7C:
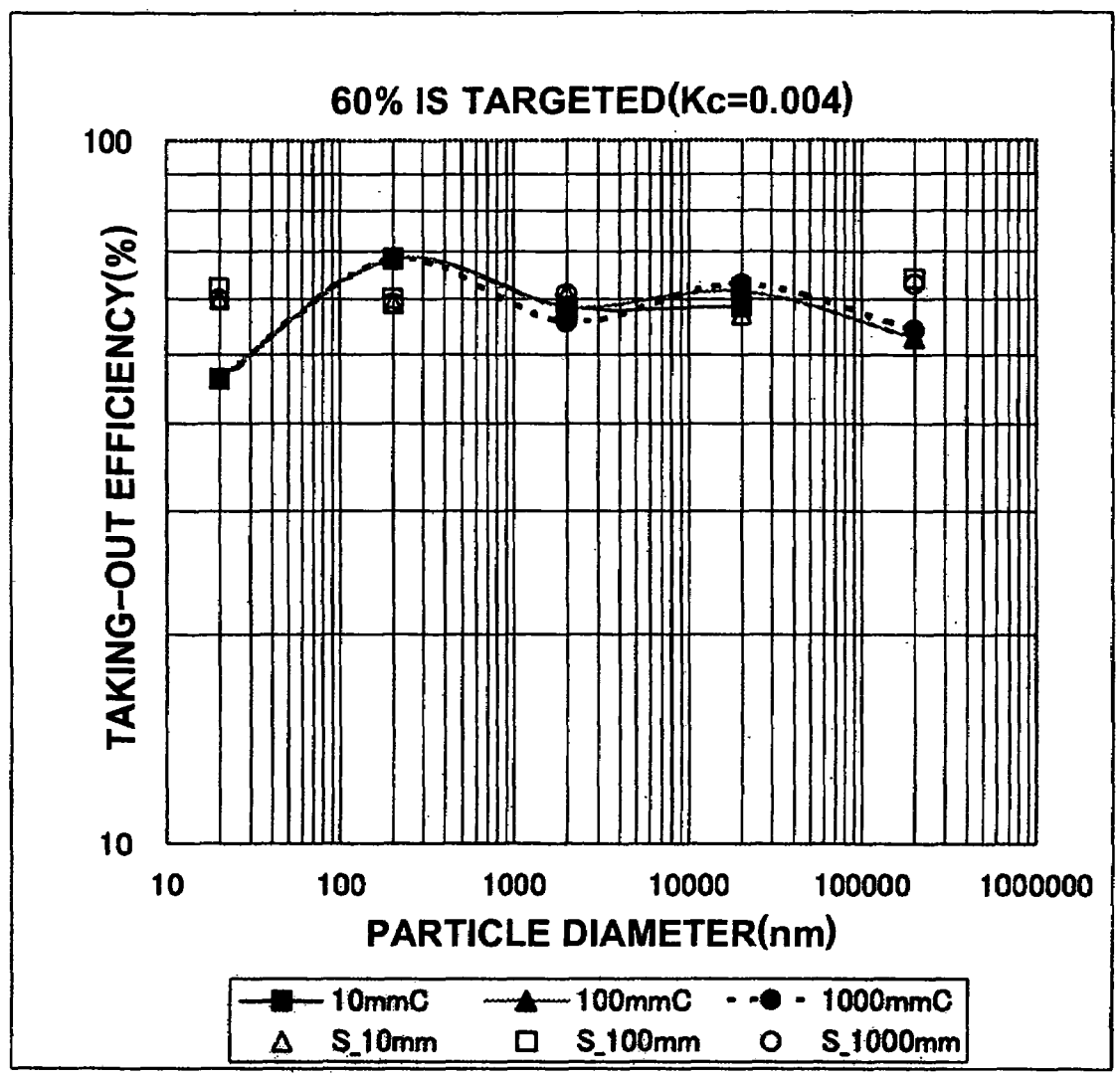
FIG. 7C is a graph showing the comparisons of results on a relationship between the particle diameter and light taking-out efficiency, obtained by the method of the present invention and the computer simulation with each other (light taking-out efficiency of 60% is targeted).
Figure 7D:
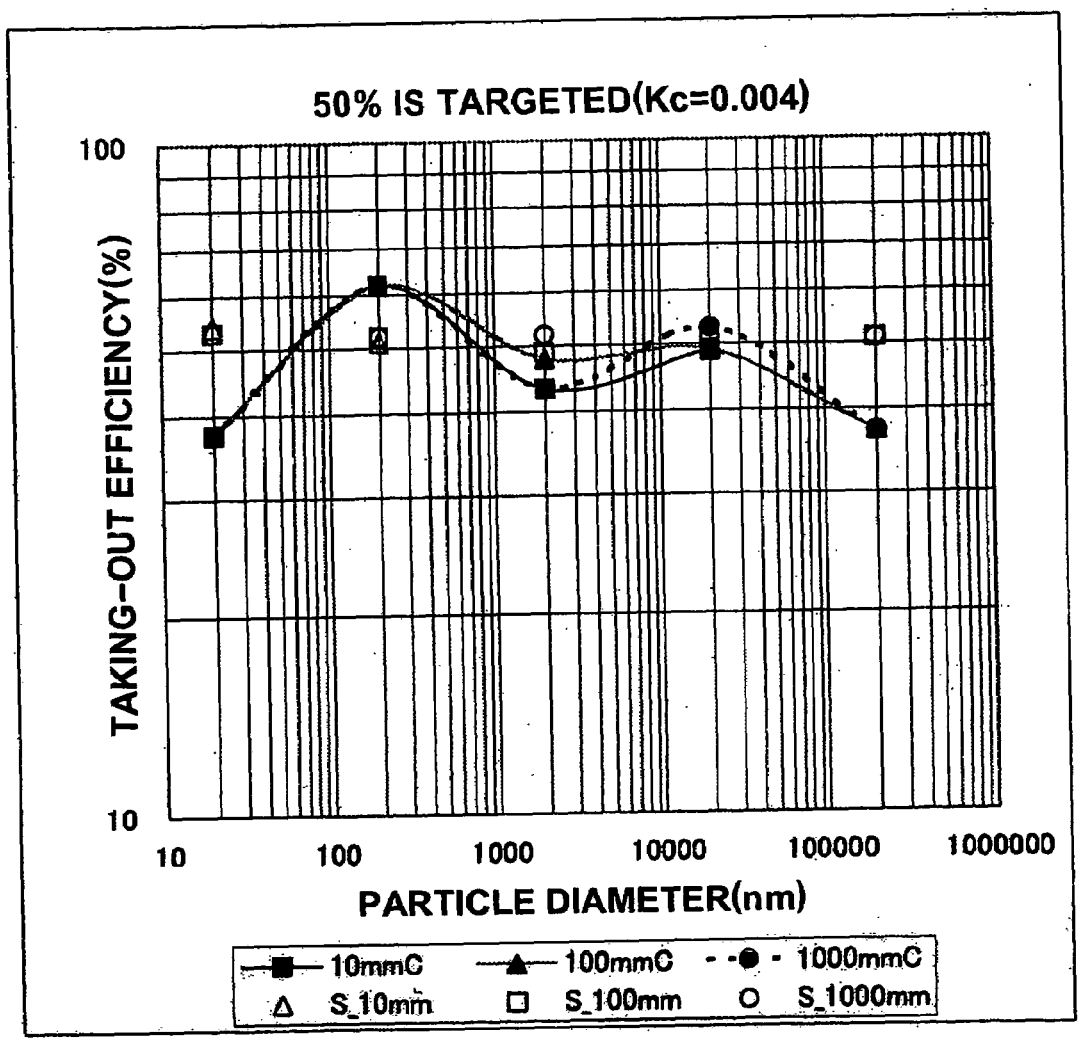
FIG. 7D is a graph showing the comparisons of results on a relationship between the particle diameter and light taking-out efficiency, obtained by the method of the present invention and the computer simulation with each other (light taking-out efficiency of 50% is targeted).
Figure 8A:
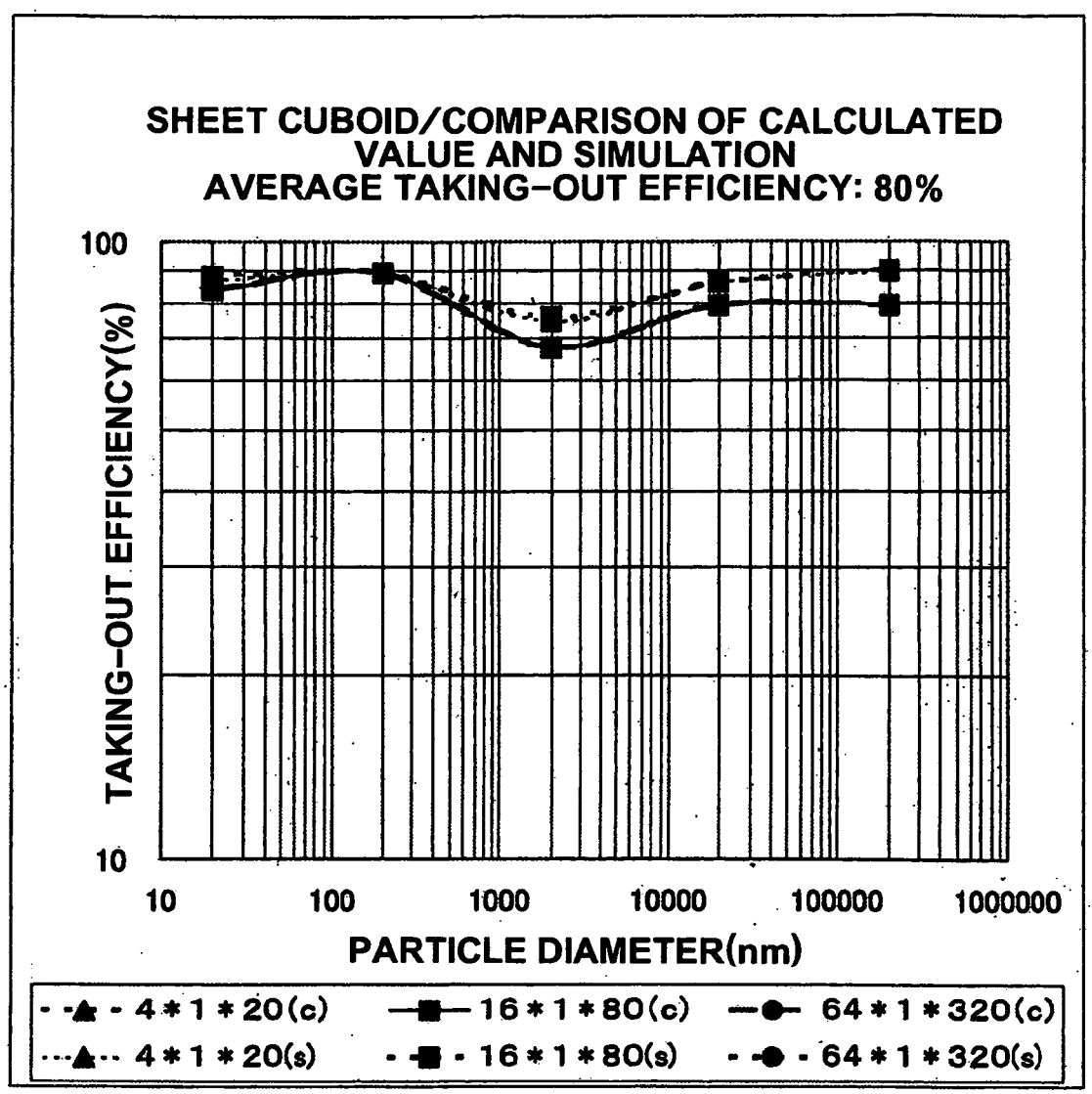
FIG. 8A is a graph showing the comparisons of results on a relationship between the particle diameter and the light taking-out efficiency in a sheet light guide, obtained by calculation and simulation (average light taking-out efficiency: 80%).
Figure 8B:
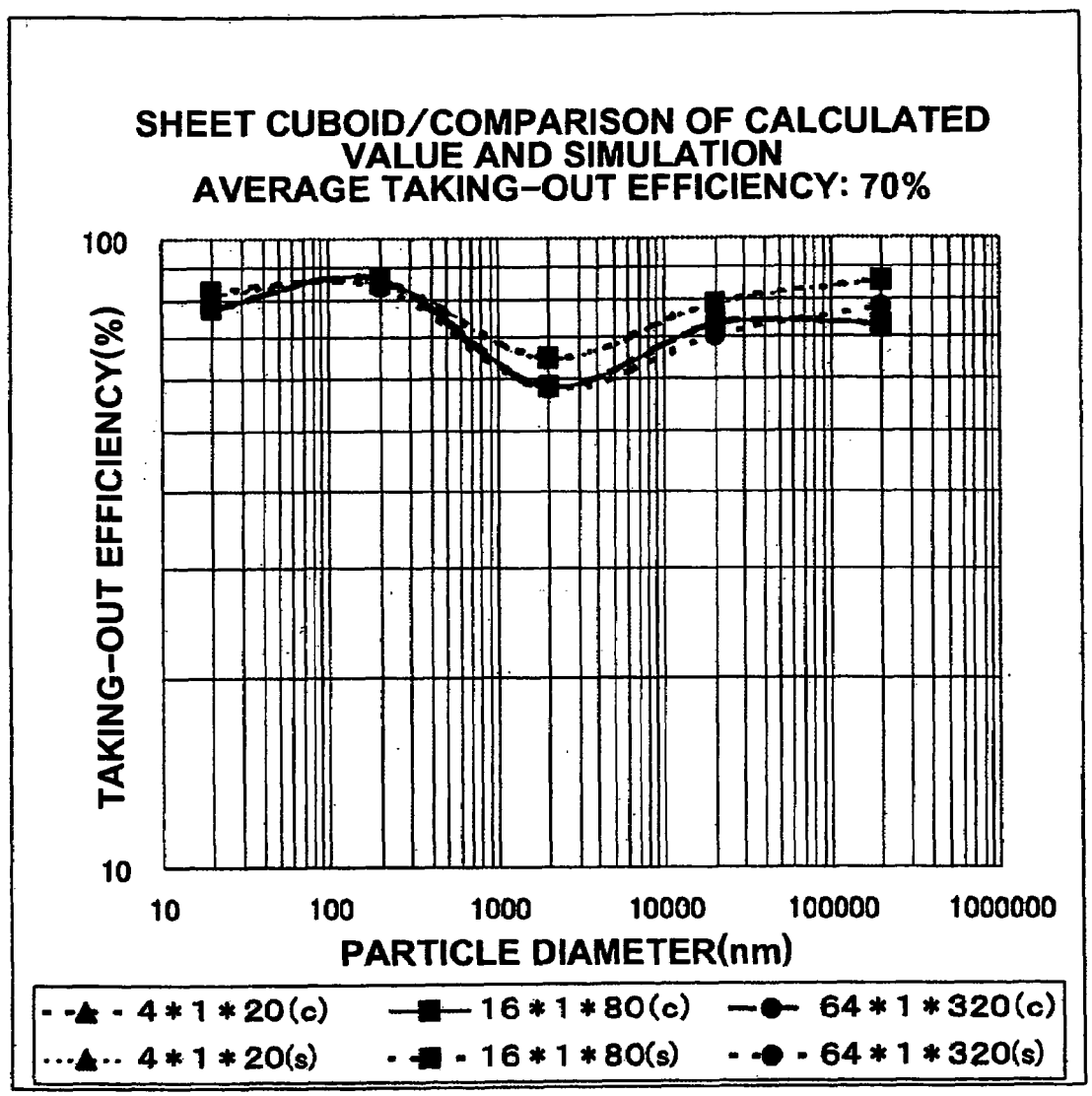
FIG. 8B is a graph showing the comparisons of results on a relationship between the particle diameter and the light taking-out efficiency in a sheet light guide, obtained by the calculation and the simulation (average light taking-out efficiency: 70%).
Figure 8C:
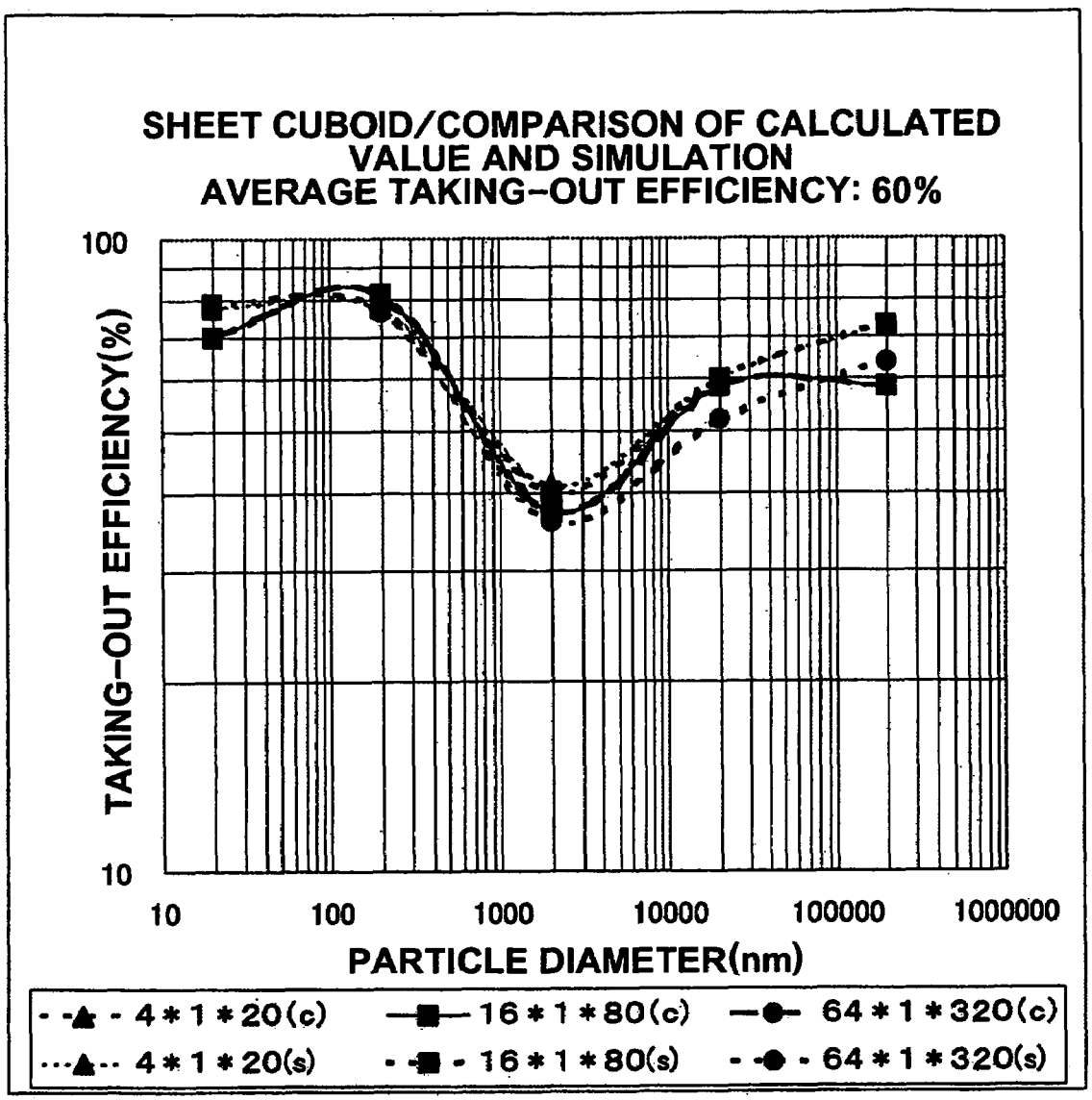
FIG. 8C is a graph showing the comparisons of results on a relationship between the particle diameter and the light taking-out efficiency in a sheet light guide, obtained by the calculation and the simulation (average light taking-out efficiency: 60%).
Figure 9A:
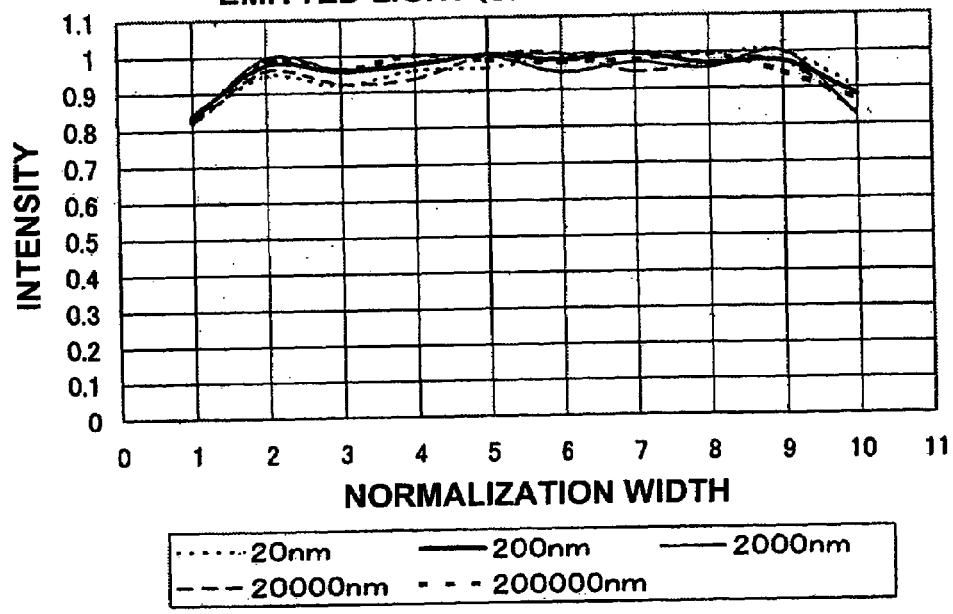
FIG. 9A is a graph showing distribution characteristics of emitted light in the sheet light guide when a sheet size is small.
Figure 9B:
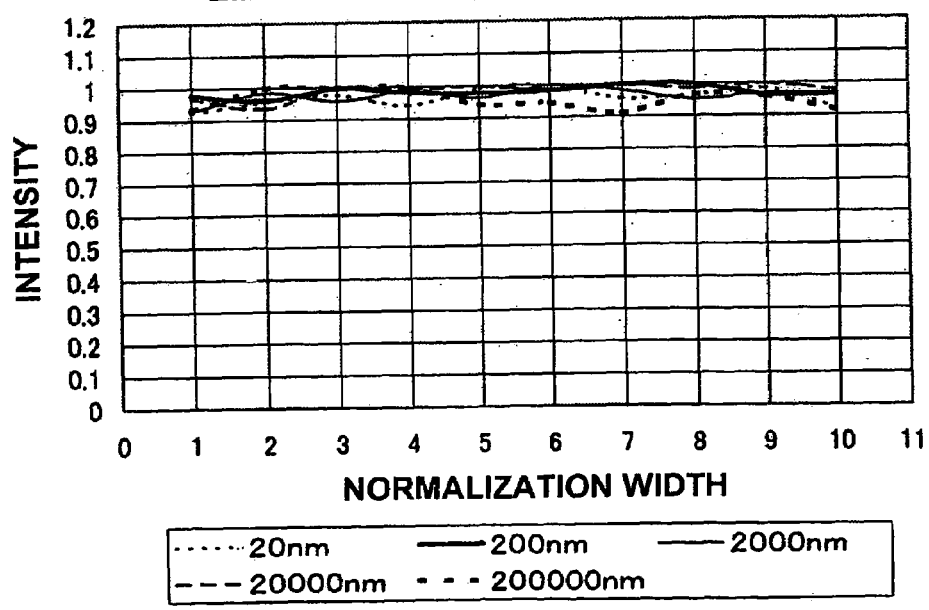
FIG. 9B is a graph showing the distribution characteristics of the emitted light in the sheet light guide when the sheet size is medium.
Figure 10:
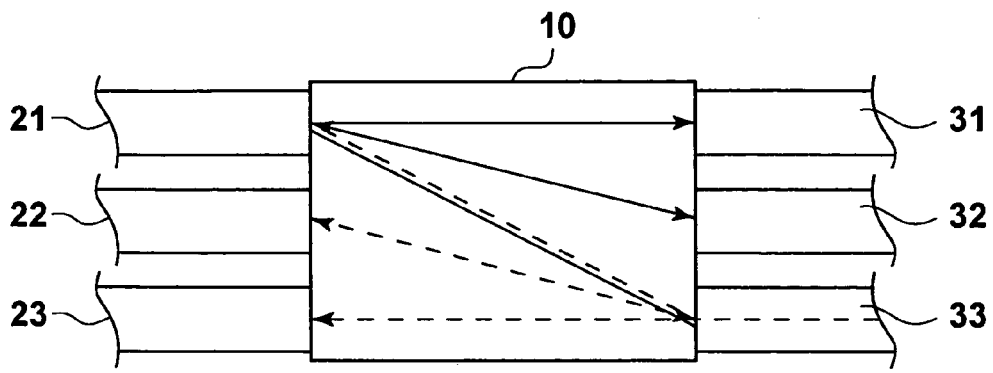
FIG. 10 is a plan view showing a schematic shape of the sheet light guide.
Figure 11:
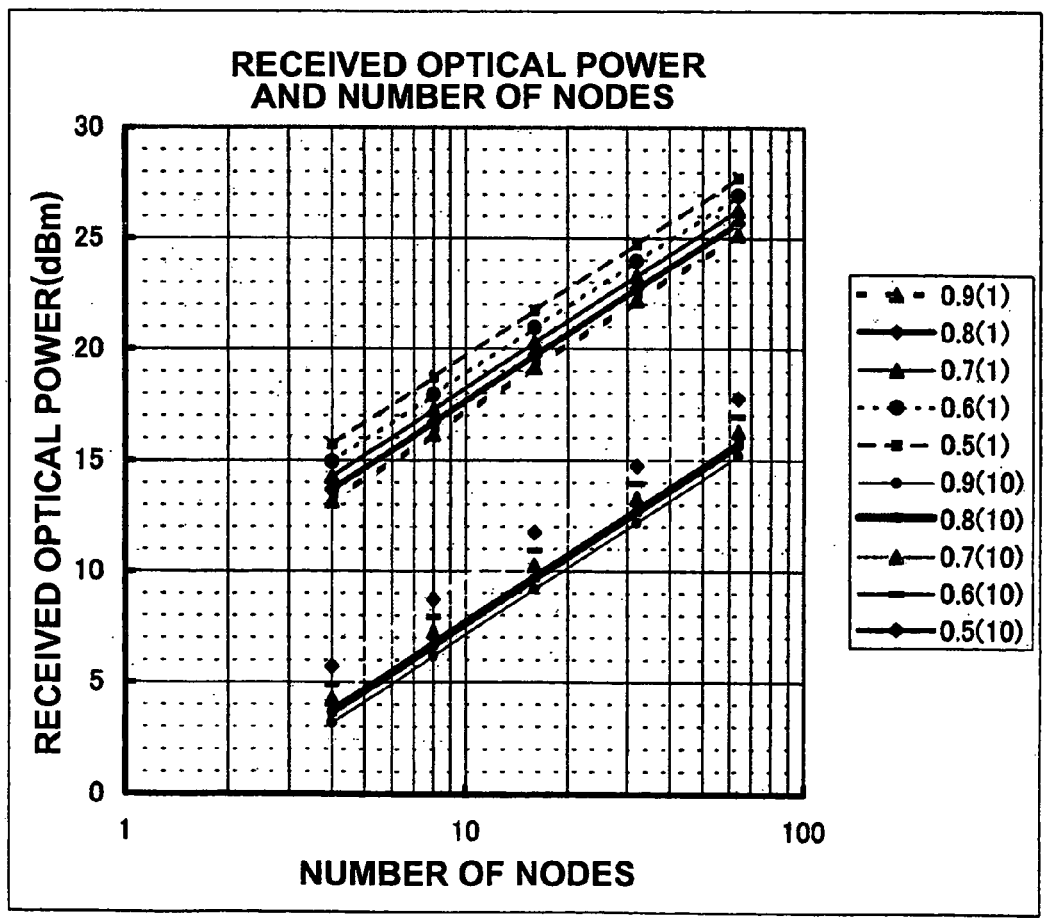
FIG. 11 is a graph showing a relationship between received optical power and the number of nodes in a communication system using the sheet light guide.
Figure 14A:
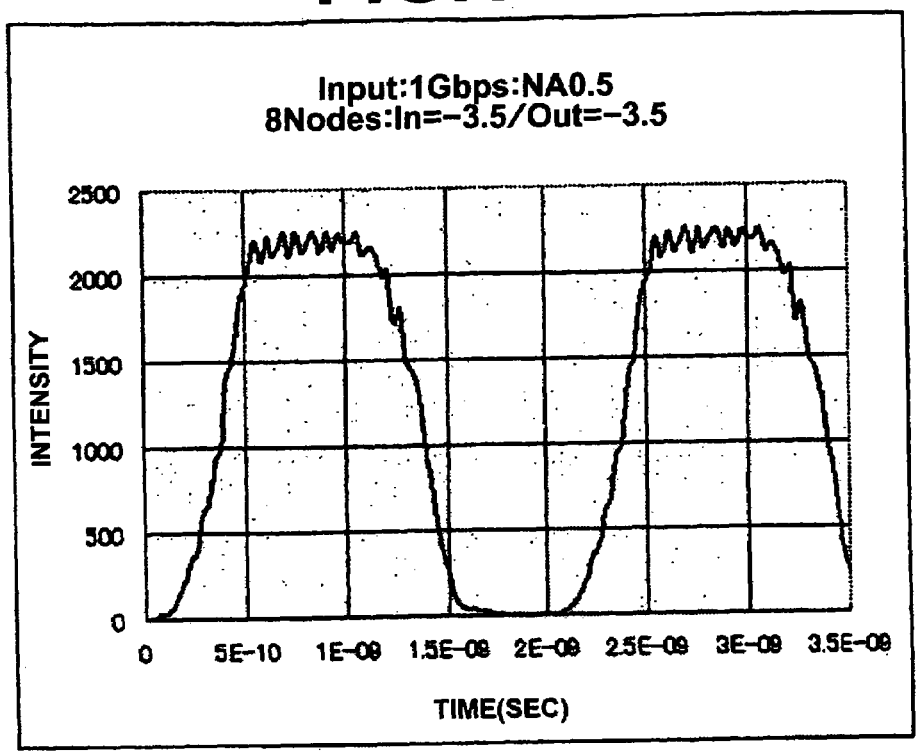
FIG. 14A is a graph showing an example of the waveform distortion of the signal light in a communication system using the sheet light guide, of which number of nodes is eight.
Figure 14B:
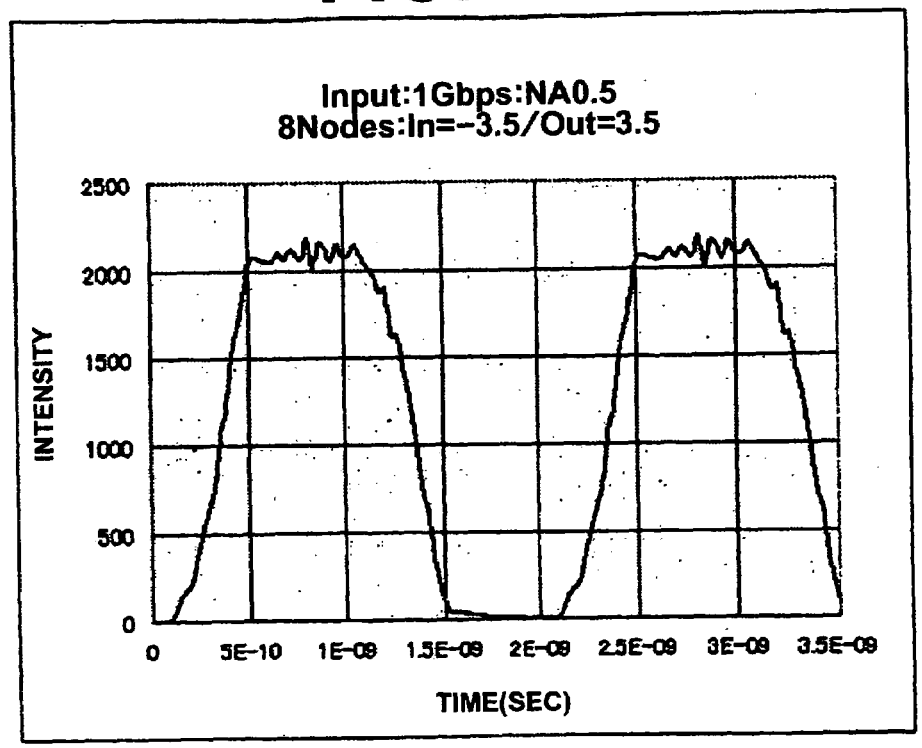
FIG. 14B is a graph showing another example of the waveform distortion of the signal light in the communication system using the sheet light guide, of which number of nodes is eight.
Figure 15A:
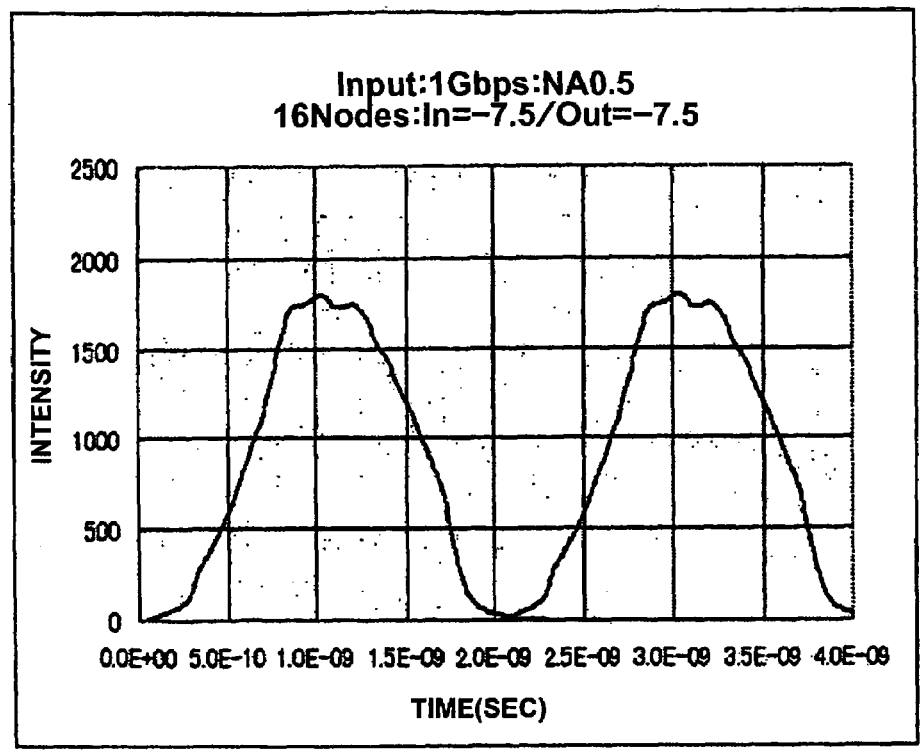
FIG. 15A is a graph showing an example of the waveform distortion of the signal light in a communication system using the sheet light guide, of which number of nodes is 16.
Figure 15B:
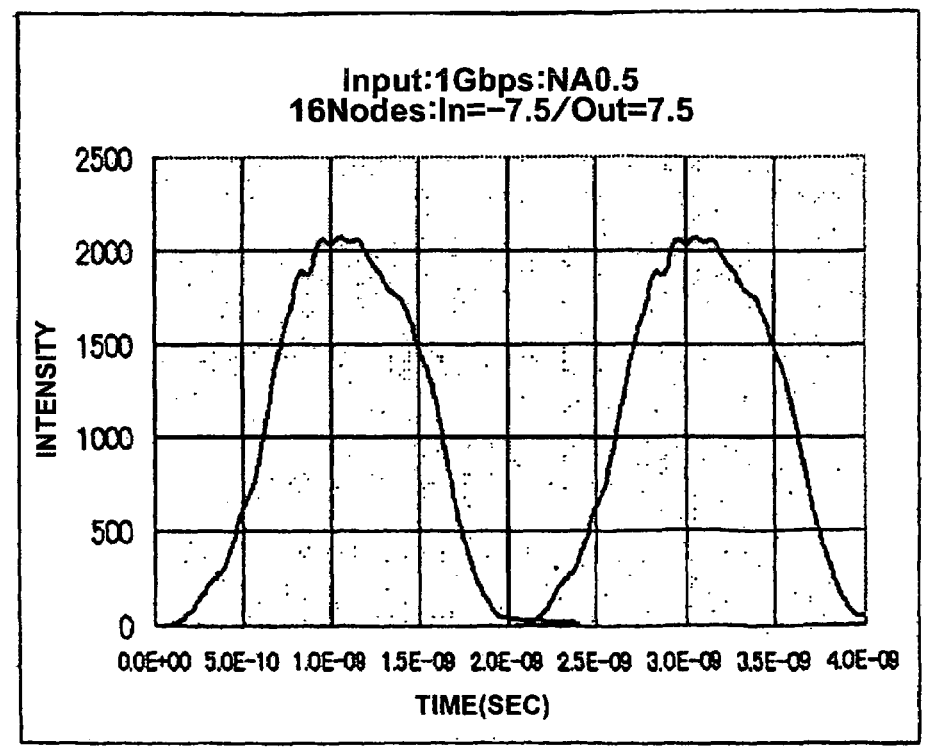
FIG. 15B is a graph showing another example of the waveform distortion of the signal light in the communication system using the sheet light guide, of which number of nodes is 16.
Figure 18:
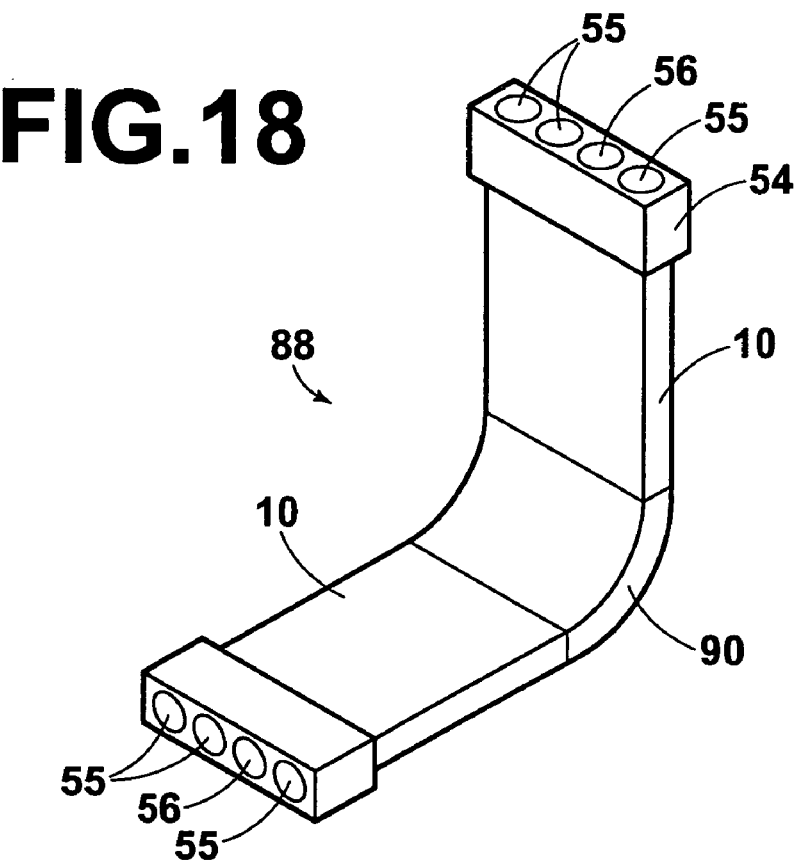
FIG. 18 is a perspective view showing a communication system according to an embodiment of the present invention.

FIG. 18 shows a perspective shape of a communication system using a sheet light guide according to an embodiment of the present invention. As illustrated, this system is configured by use of a light guide 88 having a bent portion. This light guide 88 is composed of two sheet light guides 10, each of which has basically the same configuration as that previously shown in FIG. 10, and of an angle-converting light guide 90 to which each of these sheet light guides 10 is optically coupled. The angle-converting light guide 90 has a cross-sectional shape of a quartered circular ring, and is in a state where an end surface thereof coupled to one of the sheet light guides 10 and an end surface coupled to the other sheet light guide 10 make an angle of 90°. This angle-converting light guide 90 is formed by performing injection molding of resin such as, for example, polymethylmethacrylate (PMMA), and maintains the above-described shape as long as no large external force is applied thereto in particular.

The sheet light guide 10 is formed by containing light-scattering particles in an optical medium such as, for example, the PMMA, and propagates light incident from one end surface to the other end surface side while scattering the light by the particles. Then, a light transmitting/receiving unit 54 is attached onto an end surface of each sheet light guide 10, which is on an opposite side to the angle-converting light guide 90. Each light transmitting/receiving unit 54 of this embodiment is composed of three photodetectors 55 and one phototransmitter 56.

Signal light emitted from the phototransmitter 56 of the light transmitting/receiving unit 54 coupled to the one of the sheet light guides 10 propagates through this sheet light guide 10 in the above-described manner, changes a propagation direction thereof by 90° in the angle-converting light guide 90, and is made incident onto the other sheet light guide 10. Then, the signal light propagates through the other sheet light guide 10 in a similar way, and is received by the three photodetectors 55 of the light transmitting/receiving unit 54 coupled thereto.

In the case of introducing a communication system using a sheet light guide into various instruments, the sheet light guide must be often bent. However, in general, the sheet light guide has some thickness and is not very flexible. Accordingly, when a space in such an instrument is narrow, it becomes sometimes impossible to place the sheet light guide therein in a bent manner. This point becomes a serious problem in terms of replacing a communication system using electric wires in the instrument by the communication system using the sheet light guide.

However, the communication system of this embodiment includes the angle-converting light guide 90 as described above. Thus, even if it is difficult to bend the sheet light guide 10, a communication path can be bent, and the communication system becomes easily applicable to such a narrow and complicated space in the instrument. Accordingly, the communication system of this embodiment becomes widely applicable one in place of the communication system using, for example, a flexible board and a flat cable which have been heretofore used for wiring in the narrow instrument. In addition, this communication system is not only capable of replacing the above-described conventional system but also resistant to electromagnetic noise because the communication system performs communication by means of optical signals. Meanwhile, the communication system becomes one constructible at low cost as compared with a communication system using optical fibers among communication systems performing communications by means of the optical signals.

Note that the angle-converting light guide 90 may be formed of a material different from the material of the sheet light guides 10 without being limited thereto. Moreover, the angle-converting light guide 90 is formed separately from the sheet light guides 10, and then coupled to the sheet light guides 10. However, from the beginning, the angle-converting light guide 90 may be formed integrally with the sheet light guides 10 by the injection molding and the like. Furthermore, the light-scattering particles may be or may not be contained in this angle-converting light guide 90 as in the sheet light guides 10. However, it is naturally desirable that the light-scattering particles be contained in the angle-converting light guide 90 in terms of making an intensity distribution of emitted light even.

Figure 19:
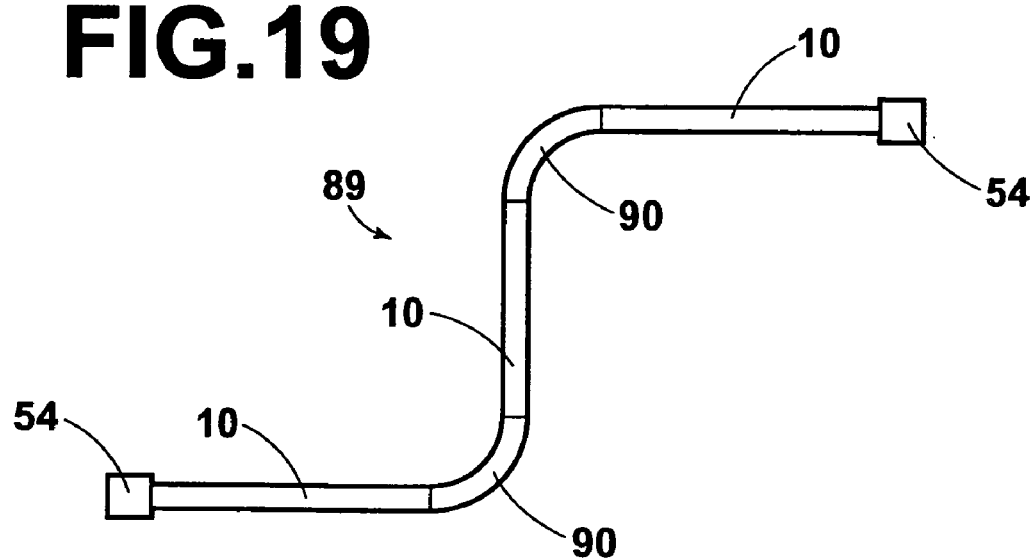
FIG. 19 is a side view showing a communication system according to another embodiment of the present invention.

Furthermore, it is also possible to constitute a more complicated light guide 89 with many bent portions by use of a plurality of the above-described angle-converting light guides 90 in a manner shown in FIG. 19,.

Figure 20A:
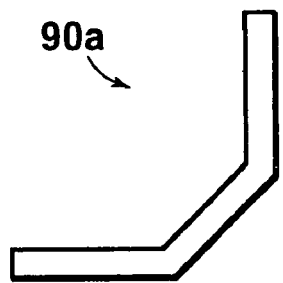
FIGS. 20A to 20C are side views showing other examples of an angle-converting light guide.
Figure 20B:
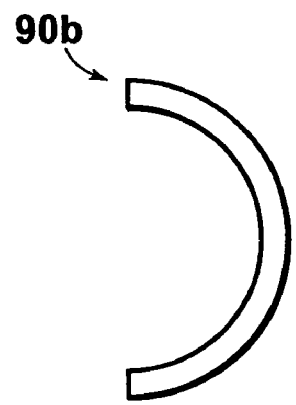
Figure 20C:
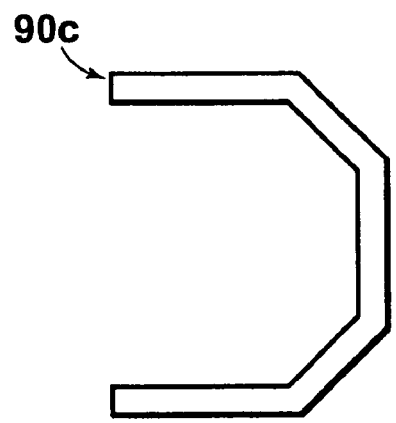

Moreover, a shape of the angle-converting light guide is not limited to one like that of the angle-converting light guide 90 described above, and shapes as illustrated in FIGS. 20A to 20C can be adopted as appropriate. Note that FIGS. 20A to 20C show cross-sectional shapes in planes orthogonal to a width direction of the angle-converting light guide. An angle-converting light guide 90a shown in FIG. 20A is that which converts the light propagation angle by 90° as in the above-described angle-converting light guide 90, but has a cross-sectional shape not of a circular arc but of bent straight lines. Moreover, an angle-converting light guide 90b shown in FIG. 20B is that which converts the light propagation angle by 180° and has a circular arc cross-sectional shape. Furthermore, an angle-converting light guide 90c shown in FIG. 20C is that which converts the light propagation angle by 180° as in the above-described angle-converting light guide 90b, but has a cross-sectional shape not of a circular arc but of bent straight lines.

What is claimed is:

1. A communication system using a sheet light guide, which is formed by containing light-scattering particles in a sheet optical medium, and propagates a signal light incident from one end surface thereof to the other end surface side, to which a photodetector is coupled, while scattering the signal light incident from one end surface thereof by the particles, wherein at least two of the sheet light guides are coupled to each other with an angle-converting light guide interposed therebetween.

2. The communication system using a sheet light guide according to claim 1, wherein, when a scattering cross section of the particles is $\Phi$, a length of the optical medium in a light propagation direction is $L_G$, a particle density is $Np$, and a correction coefficient is $K_C$, a value of $\Phi \cdot Np \cdot L_G \cdot K_C$ is 0.9 or less.

3. The communication system using a sheet light guide according to claim 2, wherein, when rms noise of the system is Noise(System_rms), an acceptable bit error rate is BER (accept), and a probability of occurrence of the Noise (System_rms) is Pr(Noise(System_rms)), the following is satisfied:

$$\mathrm{Pr(Noise(System\_rms)) \cdot Q \leq BER(accept)}$$

where Q is a proportionality constant.

4. The communication system using a sheet light guide according to claim 3, wherein, when light taking-out efficiency Eout in the sheet light guide is represented as:

$$E\mathrm{out} = \exp\{-(\Phi \cdot Np \cdot L_G K_C)\} \cdot K_L$$

where $K_L$ is a loss coefficient comprising internal transmittivity of the sheet light guide;

when a minimum received optical power $P(\mathrm{Reciver\_min})_{dBm}$ is represented as:

$$P(\mathrm{Receiver\_min})_{dBm} = -10\mathrm{Log}\{P\mathrm{in} \cdot E\mathrm{out} \cdot (NP i(\mathrm{min})/\Sigma NPi) \cdot \pi/4\} \cdot K_T$$

where Pin is incident optical power, NPi(min) is optical power of a segment in which the optical power becomes minimum, $\Sigma NPi$ is a sum of optical powers of respective segments, and $K_T$ is a loss coefficient comprising a coupling loss of an optical fiber and the sheet light guide when the optical fiber is coupled to the sheet light guide; and when a signal voltage determined from the minimum optical power $P(\mathrm{Receiver\_min})_{dBm}$ and a load resistance of the photodetector is S(PRmin)v, rms noise of the system is Noise(System_rms), and an arbitrary threshold value in binarization is V(Thresh), the following is satisfied:

$$\{S(PR\mathrm{min})v - V(\mathrm{Thresh})\} > \mathrm{Noise(System\_rms)} \cdot Q$$

5. The communication system using a sheet light guide according to claim 2, wherein, when light taking-out efficiency Eout in the sheet light guide is represented as:

$$E\mathrm{out} = \exp\{-(\Phi \cdot Np \cdot L_G \cdot K_C)\} \cdot K_L$$

where $K_L$ is a loss coefficient comprising internal transmittivity of the sheet light guide, when a minimum received optical power $P(\mathrm{Reciver\_min})_{dBm}$ is represented as:

$$P(\mathrm{Receiver\_min})_{dBm} = -10\mathrm{Log}\{P\mathrm{in} \cdot E\mathrm{out} \cdot (NPi(\mathrm{min})/\Sigma NPi) \cdot \pi/4\} \cdot K_T$$

where Pin is incident optical power, NPi(min) is optical power of a segment in which the optical power becomes minimum, $\Sigma NPi$ is a sum of optical powers of respective segments, and KT is a loss coefficient comprising a coupling loss of an optical fiber and the sheet light guide when the optical fiber is coupled to the sheet light guide; and when a signal voltage determined from the minimum optical power $P(\mathrm{Receiver\_min})_{dBm}$ and a load resistance of the photodetector is S(PRmin)v, rms noise of the system is Noise(System_rms), and an arbitrary threshold value in binarization is V(Thresh), the following is satisfied:

$$\{S(PR\mathrm{min})v - V(\mathrm{Thresh})\} > \mathrm{Noise(System\_rms)} \cdot Q$$

where Q is a proportionality constant.

6. The communication system using a sheet light guide according to claim 2, wherein, if, in the sheet light guide, the light incident thereonto repeats reflection on respective surfaces other than the incident and emitting end surfaces according to Snell's Law, and if a refractive index of a surrounding medium is Ns, a refractive index of the optical medium as a base material is Nm, an incident angle is $\theta m$, and a refraction angle is $\theta s$, if $Nm \cdot \sin \theta m = Ns \cdot \sin \theta s$ is established in the case where the particles are not contained, the sheet light guide is formed of an optical medium with a shape satisfying $\sin \theta s > 1$.

7. The communication system using a sheet light guide according to claim 2, wherein, if, in the sheet light guide, a light beam emitted from at least one emitting end surface obeys Snell's Law in reflection and refraction thereof on the emitting end surface, and if a refractive index of a peripheral medium is Ns, a refractive index of the optical medium serving as a mother material is Nm, an incident angle is $\theta m$, and a refraction angle is $\theta s$, if $Nm \cdot \sin \theta m = Ns \cdot \sin \theta s$ is established in the case where the particles are not contained, the sheet light guide is formed of an optical medium with a shape satisfying $\sin \theta s > 1$.

8. The communication system using a sheet light guide according to claim 2, wherein the sheet light is formed by mixing non-magnetic conductive particles following the Mie scattering theory into the optical medium.

9. The communication system using a sheet light guide according to claim 2, wherein the sheet light guide is formed by mixing the particles into the optical medium while a gradient is being given to a particle density thereof.

10. The communication system using a sheet light guide according to claim 2, wherein the sheet light guide is formed by combining a plurality of the optical mediums.

11. The communication system using a sheet light guide according to claim 1, wherein, if, in the sheet light guide, the light incident thereonto repeats reflection on respective surfaces other than the incident and emitting end surfaces according to Snell's Law, and if a refractive index of a surrounding medium is Ns, a refractive index of the optical medium as a base material is Nm, an incident angle is $\theta m$, and a refraction angle is $\theta s$, if $Nm \cdot \sin \theta m = Ns \cdot \sin \theta s$ is established in the case where the particles are not contained, the sheet light guide is formed of an optical medium with a shape satisfying $\sin \theta s > 1$.

12. The communication system using a sheet light guide according to claim 1, wherein, if, in the sheet light guide, a light beam emitted from at least one emitting end surface obeys Snell's Law in reflection and refraction thereof on the emitting end surface, and if a refractive index of a surrounding medium is Ns, a refractive index of the optical medium serving as a base material is Nm, an incident angle is $\theta m$, and a refraction angle is $\theta s$, if $Nm \cdot \sin \theta m = Ns \cdot \sin \theta s$ is established in the case where the particles are not contained, the sheet light guide is formed of an optical medium with a shape satisfying $\sin \theta s > 1$.

13. The communication system using a sheet light guide according to claim 1, wherein the sheet light is formed by mixing non-magnetic conductive particles following the Mie scattering theory into the optical medium.

14. The communication system using a sheet light guide according to claim 1, wherein the sheet light guide is formed by mixing the particles into the optical medium while a gradient is being given to a particle density thereof.

15. The communication system using a sheet light guide according to claim 1, wherein the sheet light guide is formed by combining a plurality of the optical mediums.

* * * * *